(12) United States Patent
Patel et al.

(10) Patent No.: US 12,530,967 B2
(45) Date of Patent: Jan. 20, 2026

(54) METHODS AND SYSTEMS FOR VEHICLE ALERTING BASED ON MAP DATA MODEL WITH LINKS AND NODES

(71) Applicant: HAAS, Inc., Chicago, IL (US)

(72) Inventors: Jigar Patel, Arlington Heights, IL (US); Cory Hohs, Chicago, IL (US); Surya Sonti, Chicago, IL (US)

(73) Assignee: HAAS, Inc., Chicago, IL (US)

( * ) Notice: Subject to any disclaimer, the term of this patent is extended or adjusted under 35 U.S.C. 154(b) by 42 days.

(21) Appl. No.: 18/583,292

(22) Filed: Feb. 21, 2024

(65) Prior Publication Data

US 2025/0265927 A1    Aug. 21, 2025

(51) Int. Cl.
*G08G 1/0967*    (2006.01)

(52) U.S. Cl.
CPC ............................... *G08G 1/096791* (2013.01)

(58) Field of Classification Search
CPC ................................................ G08G 1/096791
See application file for complete search history.

(56) References Cited

U.S. PATENT DOCUMENTS

| | | |
|---|---|---|
| 8,466,805 B2 | 6/2013 | Waymire |
| 8,612,131 B2 | 12/2013 | Gutierrez et al. |
| 9,333,913 B1 | 5/2016 | Elders et al. |
| 9,396,210 B1 | 7/2016 | Crook et al. |
| 10,127,813 B2 | 11/2018 | Walsh et al. |
| 10,169,991 B2 | 1/2019 | Massey et al. |
| 10,582,354 B1 | 3/2020 | Isaac et al. |
| 11,170,649 B2 * | 11/2021 | Ganesan ................. G08G 1/164 |
| 12,109,938 B2 | 10/2024 | Tucker et al. |
| 2006/0058950 A1 | 3/2006 | Kato et al. |
| 2010/0007523 A1 * | 1/2010 | Hatav ................. G01C 21/3697 340/901 |
| 2014/0162219 A1 * | 6/2014 | Stankoulov .......... G09B 19/167 434/65 |
| 2015/0375756 A1 * | 12/2015 | Do ........................ B60W 30/08 701/1 |
| 2017/0061706 A1 * | 3/2017 | Iehara .................... G01C 21/30 |
| 2017/0144669 A1 | 5/2017 | Spata |

(Continued)

FOREIGN PATENT DOCUMENTS

WO    2023159260 A1    8/2023

OTHER PUBLICATIONS

Notice of Allowance for U.S. Appl. No. 18/912,425, dated Jan. 29, 2025, 7 pages.

(Continued)

*Primary Examiner* — Nay Tun
(74) *Attorney, Agent, or Firm* — LOZA & LOZA, LLP

(57) ABSTRACT

Embodiments of a method and non-transitory computer readable mediums for vehicle alerting are disclosed. In an embodiment, the method for vehicle alerting involves populating a database with vehicle entries, the vehicle entries in the database including a vehicle identifier (ID) and at least one of a node ID and a link ID that correspond to a digital map that uses a map data model with node IDs and link IDs, and initiating an alert messaging operation corresponding to a vehicle ID of a vehicle entry in the database in response to a match between a search key and at least one of the node ID and the link ID of the vehicle entry, wherein the search key includes at least one of a node ID and a link ID.

18 Claims, 15 Drawing Sheets

(56) References Cited

U.S. PATENT DOCUMENTS

| | | |
|---|---|---|
| 2017/0249839 A1 | 8/2017 | Becker et al. |
| 2017/0268896 A1 | 9/2017 | Bai et al. |
| 2019/0096215 A1 | 3/2019 | Shahid et al. |
| 2020/0017117 A1* | 1/2020 | Milton ............... G08G 1/0112 |
| 2020/0101844 A1 | 4/2020 | Miller, Jr. et al. |
| 2020/0126412 A1 | 4/2020 | James |
| 2021/0097311 A1 | 4/2021 | McBeth et al. |
| 2022/0013006 A1 | 1/2022 | Srivastava et al. |
| 2022/0230036 A1 | 7/2022 | Manci et al. |
| 2022/0300641 A1* | 9/2022 | Bennati ............... H04L 63/1433 |
| 2024/0067087 A1 | 2/2024 | Tucker et al. |
| 2024/0085214 A1 | 3/2024 | Nayak et al. |
| 2024/0094010 A1 | 3/2024 | Bernhardt et al. |
| 2024/0212486 A1* | 6/2024 | Beaurepaire ......... G08G 1/0108 |

OTHER PUBLICATIONS

Non-Final Office Action for U.S. Appl. No. 18/912,425, dated Nov. 25, 2024, 22 pages.

International Search Report and Written Opinion for Application No. PCT/US25/14777, dated Apr. 22, 2025, 11 pages.

Ochieng, W.Y. et al., "Map-matching in complex urban road networks", Brazilian Journal of Cartography; 55 (2); Dec. 2003; 16 pgs.

Chen, Lei et al. "Cloud-based traffic control for interaction between autonomous vehicles and emergency vehicles", 26th ITS World Congress, Singapore, Oct. 21-25, 2019, 11 pgs.

DRM, "Digital Road Map, The Essential Basis of ITS for Safer, Smarther and Cleaner Road Transport", Sep. 2013, 8 pgs.

Erke, Shang et al. "An improved A-Star based path planning algorithm forautonomous land vehicles", International Journal of Advanced Robotic Systems, vol. 17, Issue 5, Sep.-Oct. 2020, 21 pgs.

Gupta, Ajay Kumar et al. "A Comprehensive Review of Map-Matching Techniques: Empirical Analysis, Taxonomy, and Emerging Research Trends", International Journal of Web Services Research vol. 19, Issue 1, Nov. 2022, 32 pgs.

Huang, Zhenfeng et al. "Survey on vehicle map matching techniques", CAAI Transactions on Intelligence Technology, 2021, pp. 55-71.

Liu, Yungxiang et al. "Automatic driving path planning based on A-Star algorithm", ICIIBMS 2022.Track 1: Image Processing, Computer Science and Information Technology, Nara, Japan, Nov. 24-26, 2022, pp. 19-21.

Luz, Philipp et al. "Lane-Level Map-Aiding Approach Based on Non-Lane-Level Digital Map Data in Road Transport Security", Sustainability 2021, 13, 9724, 18 pgs.

Saki, Siavash et al. "A Practical Guide to an Open-Source Map-Matching Approach for Big GPS Data", SN Computer Science (2022) 3: 415, 13 pgs.

IBM, "Map matching", Website [online]. Last updated Jan. 11, 2024 [retrieved Jan. 26, 2024]. Retrieved from the internet: <https://www.ibm.com/docs/en/icvi/continuous-delivery?topic=mapping-map-matching>, 3 pgs.

IBM, "Map data model", Website [online]. Last updated Jan. 11, 2024 [retrieved Jan. 26, 2024]. Retrieved from the internet: <https://www.ibm.com/docs/en/icvi/continuous-delivery?topic=mapping-map-data-model>, 5 pgs.

U.S. Department of Transportation , Federal Highway Administration, "2019 Version: vol. III: Guidelines for Applying Traffic Microsimulation Modeling Software 2019 Update to the 2004 Version", 2019, 6 pgs.

U.S. Department of Transportation , Federal Highway Administration, "Traffic Analysis Toolbox vol. III: Guidelines for Applying Traffic Microsimulation Modeling Software", 2019 Update to the 2004 Version, https://ops.fhwa.dot.gov/publications/fhwahop18036/index.htm, 2019, 130 pgs.

* cited by examiner

*330*

| Vehicle ID | Location Information | Supplemental Information |
|---|---|---|
| 332 | 334 | 336 |

| Vehicle ID | Location Information | Supplemental Information | Alert ID |
|---|---|---|---|
| 342 | 344 | 346 | 348 |

FIG. 3C

Vehicle A Telemetry Data: Lat/ Long, Velocity, Direction

⇩

Map Matching: Lat/ Long ⟶ Link 3-4

⇩

Most Probable Path: Lat/ Long, Velocity Direction ⟶ Node IDs: 4, 5, 6
Link IDs: 3-4, 4-5, 5-6

```
Receive Vehicle Telemetry Data (Vehicle ID Lat/
Long, Velocity, Direction)                          ~502
              │
              ▼
Map Matching (Node ID/ Link ID)                     ~504
              │
              ▼
Most Probable Path (Set Of Node ID(s)/ Link ID(s))  ~506
              │
              ▼
Populate Database With Vehicle Entry (Vehicle ID,
Set Of Node ID(s)/ Link ID(s))                      ~508
```

FIG. 5

| Alerting Vehicle | Non-Alerting Vehicles |
|---|---|
| Alerting Vehicle X: (Vehicle ID, Node ID(s), Link ID(s))<br><br>Alerting Vehicle Y: (Vehicle ID, Node ID(s), Link ID(s)) | Vehicle 1: (Vehicle ID, Link IDs, Node IDs)<br><br>Vehicle 2: (Vehicle ID, Link IDs, Node IDs)<br>⋮<br>Vehicle N: (Vehicle ID, Link IDs, Node IDs) |

Match
Alerting Vehicle X (Node ID: 5) = Vehicle Z (Node ID: 5)

| | 704 | 706 | 708 | 710 |
|---|---|---|---|---|
| | Entry ID | Vehicle ID | Node ID(s) | Link ID(s) |
| 702 | 0001 | 3119601623 | 26218639 | - |
| | 0002 | 1742471050 | 53528585 | 1698530 1698531 |
| Search Key (Node ID(s)/ Link ID(s)) | 0003 | 4251643515 | - | 62626100 |
| | 0004 | 7041408605 | 50049225 | 17287004 |
| 720 | ⋮ | ⋮ | ⋮ | ⋮ |
| | 1394 | 1137162183 | 22920109 22920110 22920111 | 63782311 63782312 |

FIG. 7

METHODS AND SYSTEMS FOR VEHICLE ALERTING BASED ON MAP DATA MODEL WITH LINKS AND NODES

BACKGROUND

Cloud based safety systems may establish an alerting zone relative to an alerting vehicle and then send alerts to other vehicles that are located within the alerting zone. A conventional way of establishing an alerting zone involves identifying a geographical area that covers a projected route of an alerting vehicle and/or a geographical area that surrounds an alerting vehicle and sending alert messages to vehicles that are within the geographical area of the alerting zone. Typically, such alerting zones are defined in terms of latitude and longitude coordinates. Managing alerting zones in a safety system that services a large number of vehicles can be cumbersome and resource intensive.

SUMMARY

Embodiments of a method and non-transitory computer readable mediums for vehicle alerting are disclosed. In an embodiment, the method for vehicle alerting involves populating a database with vehicle entries, the vehicle entries in the database including a vehicle identifier (ID) and at least one of a node ID and a link ID that correspond to a digital map that uses a map data model with node IDs and link IDs, and initiating an alert messaging operation corresponding to a vehicle ID of a vehicle entry in the database in response to a match between a search key and at least one of the node ID and the link ID of the vehicle entry, wherein the search key includes at least one of a node ID and a link ID.

In an example, the method further involves map matching location information corresponding to a vehicle to at least one of a node ID and a link ID on the digital map, and defining a most probable path of the vehicle in terms of a set of map identifiers that includes at least one of a node ID and a link ID.

In an example, the location information includes latitude and longitude coordinates of the vehicle.

In an example, defining the most probable path of the vehicle in terms of a set of map identifiers that includes at least one of a node ID and a link ID involves using motion information corresponding to the vehicle to predict the set of map identifiers.

In an example, the motion information includes at least one of a speed, acceleration, trajectory, direction, and azimuth of the vehicle.

In an example, the method further includes generating the search key, wherein generating the search key involves map matching location information corresponding to an alerting vehicle to at least one of a node ID and a link ID on the digital map, and defining a most probable path of the alerting vehicle in terms of a set of map identifiers that includes at least one of a node ID and a link ID.

In an example, the location information includes latitude and longitude coordinates of the vehicle.

In an example, defining the most probable path of the alerting vehicle in terms of a set of map identifiers that includes at least one of a node ID and a link ID involves using motion information corresponding to the alerting vehicle to predict the set of map identifiers.

In an example, the motion information includes at least one of a speed, acceleration, trajectory, direction, and azimuth of the vehicle.

In an example, the method further involves generating a vehicle entry by map matching location information corresponding to a vehicle to at least one of a node ID and a link ID on the digital map, and defining a most probable path of the vehicle in terms of a set of map identifiers that includes at least one of a node ID and a link ID, and generating the search key by map matching location information corresponding to an alerting vehicle to at least one of a node ID and a link ID on the digital map, and defining a most probable path of the alerting vehicle in terms of a set of map identifiers that includes at least one of a node ID and a link ID.

In an example, the location information corresponding to the vehicle includes latitude and longitude coordinates of the vehicle, and the location information corresponding to the alerting vehicle includes latitude and longitude coordinates of the alerting vehicle.

In an example, defining the most probable path of the vehicle in terms of a set of map identifiers that includes at least one of a node ID and a link ID involves using motion information corresponding to the vehicle to predict the set of map identifiers, and defining the most probable path of the alerting vehicle in terms of a set of map identifiers that includes at least one of a node ID and a link ID involves using motion information corresponding to the alerting vehicle to predict the set of map identifiers.

In an example, the motion information corresponding to the vehicle includes at least one of a speed, acceleration, trajectory, direction, and azimuth of the vehicle, and the motion information corresponding to the alerting vehicle includes at least one of a speed, acceleration, trajectory, direction, and azimuth of the alerting vehicle.

In an example, the method further involves generating a vehicle entry by map matching location information corresponding to a vehicle to at least one of a node ID and a link ID on the digital map, and defining a most probable path of the vehicle over a specific time interval in terms of a set of map identifiers that includes at least one of a node ID and a link ID, and generating the search key by map matching location information corresponding to an alerting vehicle to at least one of a node ID and a link ID on the digital map, and defining a most probable path of the alerting vehicle over a specific time interval in terms of a set of map identifiers that includes at least one of a node ID and a link ID.

In an example, the specific time interval is in the range of 10-40 seconds.

A non-transitory computer readable medium comprising instructions to be executed in a computer system is also disclosed. The instructions when executed in the computer system perform a method that involves populating a database with vehicle entries, the vehicle entries in the database including a vehicle identifier (ID) and at least one of a node ID and a link ID that correspond to a digital map that uses a map data model with node IDs and link IDs, and initiating an alert messaging operation corresponding to a vehicle ID of a vehicle entry in the database in response to a match between a search key and at least one of the node ID and the link ID of the vehicle entry, wherein the search key includes at least one of a node ID and a link ID.

Another example of a method for alerting vehicles is disclosed. The method involves receiving vehicle telemetry data, the vehicle telemetry data including location information and motion information, populating a database with data generated from the received vehicle telemetry data, wherein the database is populated with vehicle entries that include a vehicle identifier (ID) and at least one of a node ID and a link ID, receiving alerting vehicle telemetry data from an alerting vehicle, the alerting vehicle telemetry data including location information and motion information, assigning at least one of a node ID and a link ID to the alerting vehicle in response to the vehicle telemetry data, finding a match between a vehicle entry in the database and the alerting vehicle, wherein a match involves the vehicle entry and the alerting vehicle having at least one of a node ID and a link ID in common, and initiating an alert messaging operation corresponding to a vehicle ID of the matching vehicle entry in response to the match.

Another example of a method for alerting vehicles is disclosed. The method involves receiving first vehicle telemetry data, the first vehicle telemetry data including location information related to a first vehicle, generating a first set of at least one of a node ID and a link ID from the first vehicle telemetry data, receiving second vehicle telemetry data, the second vehicle telemetry data including location information related to a second vehicle, generating a second set of at least one of a node ID and a link ID from the second vehicle telemetry data, and initiating an alert messaging operation for a vehicle ID corresponding to the first vehicle in response to the first set of a node ID and a link ID and the second set of a node ID and a link ID having at least one of a node ID and a link ID in common.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 3B is an example of a vehicle data message that is used to communicate vehicle telemetry data from a vehicle to the vehicle tracking system and/or to a safety cloud.

FIG. 3C is an example of an alerting vehicle data message that is used to communicate alerting vehicle telemetry data from an alerting vehicle to the alert tracking system and/or to the safety cloud.

FIG. 5 is a process flow diagram of a process for generating entries in a vehicle tracking database that utilizes node IDs and link IDs of a node/link based map data model.

FIG. 6 illustrates a table of information about alerting vehicles and non-alerting vehicles.

FIG. 7 illustrates a vehicle tracking database that includes multiple vehicle entries.

Throughout the description, similar reference numbers may be used to identify similar elements.

DETAILED DESCRIPTION

Figure 1:
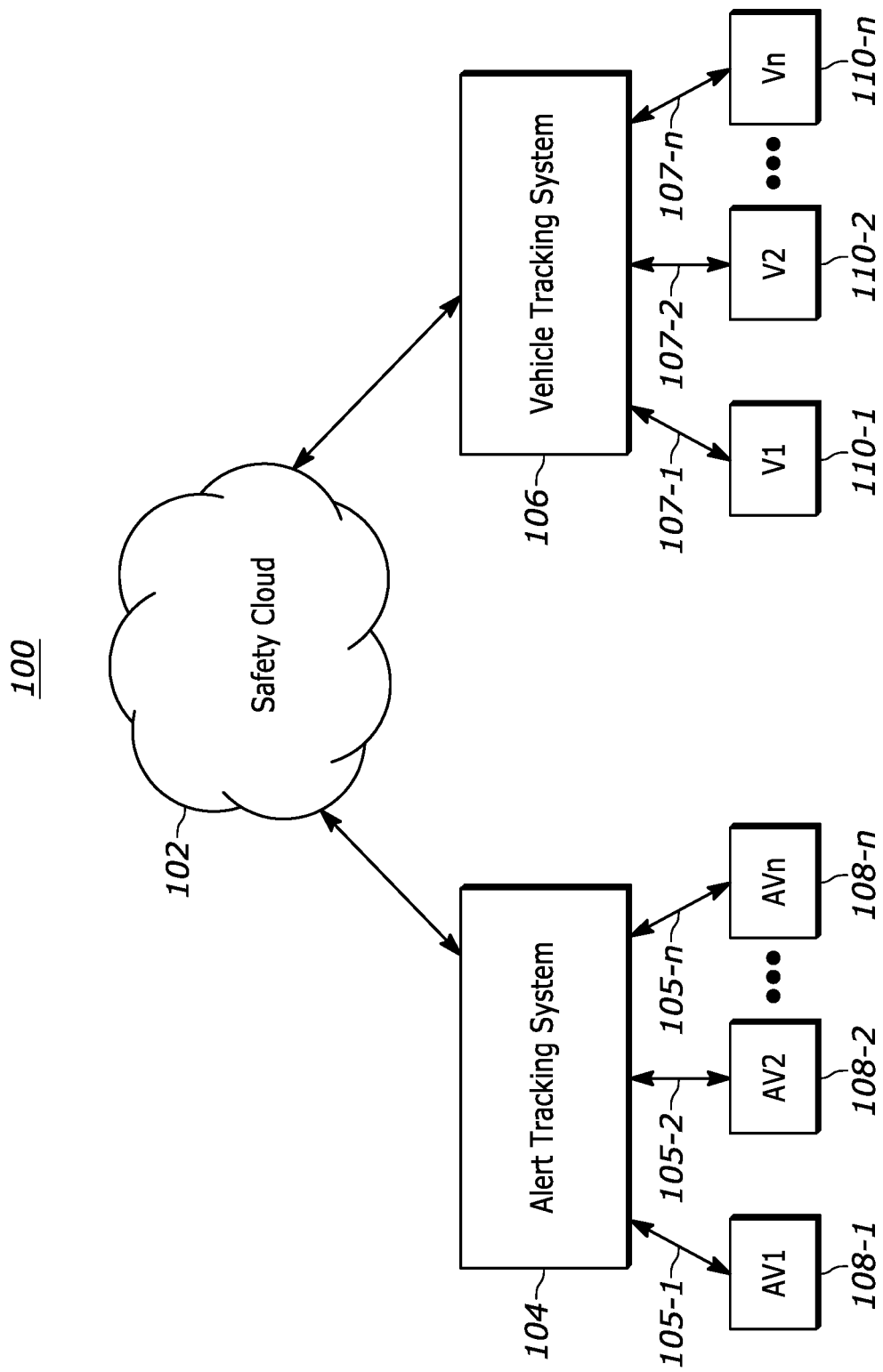
FIG. 1 is a high-level overview of a safety system for vehicle alerting.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

An "alerting zone" may be characterized as a geographical area near an alerting vehicle, near a route of the alerting vehicle, near a safety hazard (e.g., a construction zone, a car accident, a vehicle stopped along the side of the road, a lane closure, a road closure, etc.), or any combination thereof. Examples of an alerting zone may include, but are not limited to, a geographical area that covers a projected path of an alerting vehicle (plus X miles along each side of the path), a geographical area that surrounds an alerting vehicle (by X miles) and that changes as the alerting vehicle changes locations (e.g., travels along a projected path), or a geographical area that is within an X (X represents a positive value) mile radius of a safety hazard. In some examples, the geographical area of an alerting zone is defined by a set of geographical coordinates that are within a predetermined range of a particular location. In some embodiments, the geographical area may resemble a circle, an oval, a rectangle, a line, or other shape. In an embodiment, an alerting zone is determined by/in a safety cloud of a safety system. An example of a safety system is described in further detail with reference to FIG. 1.

FIG. 1 is a high-level overview of a safety system 100. The safety system 100 includes a safety cloud 102 that is connected to an alert tracking system 104 and to a vehicle tracking system 106. The safety cloud 102 may be implemented via software running on a computing system such as a remote server, a public cloud (e.g., Amazon Web Services (AWS), Google Cloud, Microsoft Azure, etc.), and/or a private cloud. In an embodiment, the safety cloud is implemented via a cloud computing system. The alert tracking system 104 and/or the vehicle tracking system 106 may be implemented via third-party computing systems, including for example, software running on a computing system such as a remote server, a public cloud, and/or a private cloud.

The alert tracking system 104 connects to one or more alerting vehicles (AVs), implemented as alerting vehicles AV1 108-1, AV2 108-2, and AVn 108-n (where n represents an integer of one or more), via, for example, a wireless service provider network (e.g., 3G, 4G, 5G, etc.). Alerting vehicles AV1 108-1, AV2 108-2, and AVn 108-n connect to the alert tracking system 104 over wireless connections via a first connection 105-1, a second connection 105-2, and an nth connection 105-n, respectively. Examples of the alerting vehicles include emergency vehicles (e.g., a police car, an ambulance, a firetruck, a military vehicle, or the like), safety vehicles (e.g., a construction vehicle, a towing vehicle, or the like), and/or other vehicles/devices that are capable of sending alerting vehicle data and/or connecting to the alert tracking system 104 over a wireless connection via a wireless service provider network. The alerting vehicles AVs 108-1, 108-2, and 108-n may be included in an emergency vehicle fleet (e.g., a fleet of police cars corresponding to a police department, a fleet of firetrucks corresponding to a fire department, etc.). In an embodiment, the AVs 108-1, 108-2, and 108-n are equipped with radios (e.g., a fixed radio and/or a mobile radio) to implement a wireless connection with a wireless service provider network. Although an alerting vehicle may commonly be a vehicle, the alerting vehicle may alternatively be an object with a radio that is capable of sending telemetry data and/or of connecting to the alert tracking system 104.

In an embodiment, alerting vehicles AV1 108-1, AV2 108-2, and AVn 108-n transmit alerting vehicle telemetry data to the alert tracking system 104. As an example, the alerting vehicle telemetry data may include a vehicle ID that corresponds to the vehicle (e.g., AV1 308-1, AV2 308-2, or AVn 308-n), location information (e.g., longitude and latitude coordinates) that corresponds to the location of the vehicle, a speed, acceleration, trajectory, direction, and/or azimuth of the vehicle, and an alert ID that indicates whether emergency lights of an alerting vehicle are on/off. In an example, the alerting vehicles transmit alerting vehicle telemetry data to the alert tracking system on regular intervals, such as 2 second intervals. In some examples, the interval may be different depending on the state of the alerting vehicle, for example, in a range of 1-20 second intervals. For example, an alerting vehicle may transmit vehicle telemetry data at shorter time intervals while the vehicle is in an alerting state (e.g., while its emergency lights are on).

The vehicle tracking system 106 connects to one or more vehicles (V), implemented as vehicles V1 110-1, V2 110-2, and Vn 110-n (n represents an integer greater than one), via a wireless service provider wireless network. Vehicles V1 110-1, V2 110-2, and Vn 110-n connect to the vehicle tracking system over wireless connections via a first connection 107-1, a second connection 107-2, and an nth connection 107-n, respectively. As described herein, a "vehicle" may refer to a civilian vehicles, a consumer vehicle, or more generally to a vehicle that is not configured as an alerting vehicle. For example, the vehicles V1 110-1, V2 110-2, and Vn 110-n are considered as "non-alerting" vehicles because the vehicles are not connected to the alert tracking system 104, the vehicles do not have emergency lights or a siren, and/or the vehicles are not configured to transmit an alert signal that indicates whether or not emergency lights and/or siren are on. The vehicles V1 110-1, V2 110-2, and Vn 110-n may be included in a vehicle fleet (e.g., a fleet of cars owned by a company). In an embodiment, the vehicles V1 110-1, V2 110-2, and Vn 110-n are equipped with radios (e.g., a fixed radio and/or a mobile radio) to implement a wireless connection to a wireless service provider network. In an embodiment, vehicles V1 110-1, V2 110-2, and Vn 110-n periodically send vehicle telemetry data to the vehicle tracking system 106 via the wireless service provider network. In an example, the vehicles transmit vehicle telemetry data to the vehicle tracking system on regular intervals, such as 2 second intervals. In some examples, the interval may be different depending on different factors, for example in a range of 1-20 second intervals. For example, a vehicle may transmit vehicle telemetry data at shorter time intervals while the vehicle is in an alerting zone. In an example, the vehicle telemetry data may include a vehicle ID that corresponds to the vehicle (e.g., V1 110-1, V2 110-2, or Vn 110-n), location information (e.g., longitude and latitude coordinates) that corresponds to the location of the vehicle, a speed, acceleration, trajectory, direction, and/or azimuth of the vehicle. Although vehicles V1 110-1, V2 110-2, and Vn 110-n may commonly be vehicles, the vehicles V1, V2, and/or Vn may also be an object such as a radio, a smartphone, or other similar device capable of sending telemetry data and/or of connecting to the vehicle tracking system 106.

In some embodiments, the safety cloud 102 receives alerting vehicle telemetry data from alerting vehicles AV1 108-1, AV2 108-2, and/or AVn 108-n via the alert tracking system 104, and receives vehicle telemetry data from vehicles V1 110-1, V2 110-2, and/or Vn 110-n via the vehicle tracking system 106. The safety cloud 102 may use the alerting vehicle telemetry data to determine an alerting zone that is associated with an alerting vehicle. The safety cloud 102 may use the vehicle telemetry data to determine whether any non-alerting vehicles are located in the alerting zone, and to determine whether or not to provide an alert to vehicles that are located in the alert zone, where the alert may indicate that there is a potential hazard nearby.

Cloud based safety systems, similar to the system described with reference to FIG. 1, may establish an alerting zone relative to an alerting vehicle and then send alerts to non-alerting vehicles that are located within the alerting zone. A conventional way of establishing an alerting zone involves identifying a geographical area that covers a projected path of an alerting vehicle and/or a geographical area that surrounds the alerting vehicle.

Examples of how a cloud-based system can be used to alert vehicles of potential hazards is described with reference to FIGS. 2A, 2B, and 3A-3E.

Figure 2A:
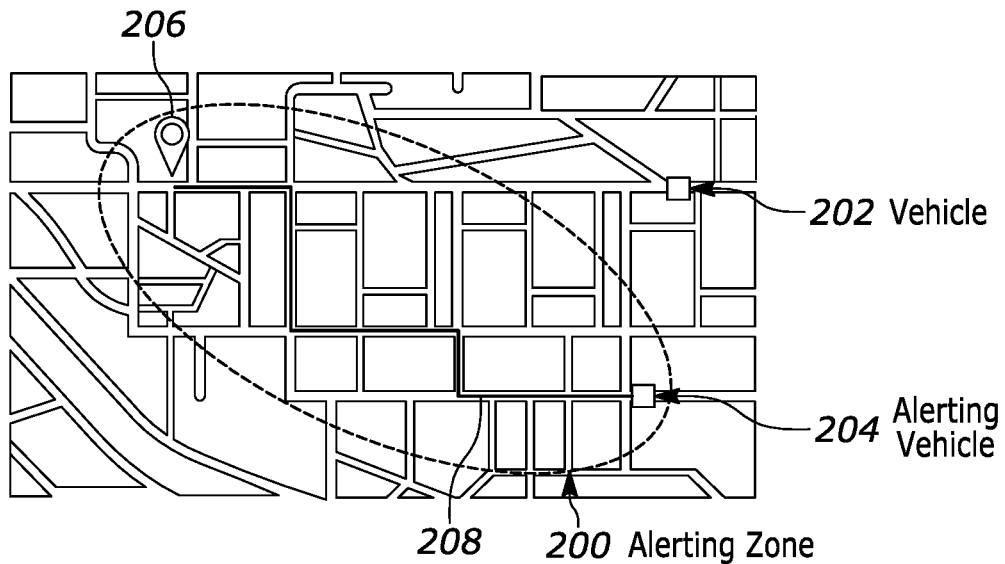
FIG. 2A depicts an example of a vehicle located outside an alerting zone.

FIG. 2A depicts an example of a vehicle 202 that is located outside of an alerting zone 200. In the example illustrated by FIG. 2A, the alerting zone 200 is a geographical area that surrounds an alerting vehicle 204. In the example, the alerting zone 200 includes a geographical area around a destination 206 of the alerting vehicle 204 and a projected path 208 of the alerting vehicle to the destination. The destination 206 may be, for example, an emergency site (e.g., a car accident, a structure fire, a crime site, or the like), a safety hazard (e.g., a weather hazard, a road closure, a lane closure, a road obstruction, or the like), or other similar destination. Because the vehicle 202 is located outside of the alerting zone 200, the safety cloud determines that the vehicle does not need to be alerted about the presence of the alerting vehicle 204. Thus, no alerting message is sent to the vehicle 202.

Figure 2B:
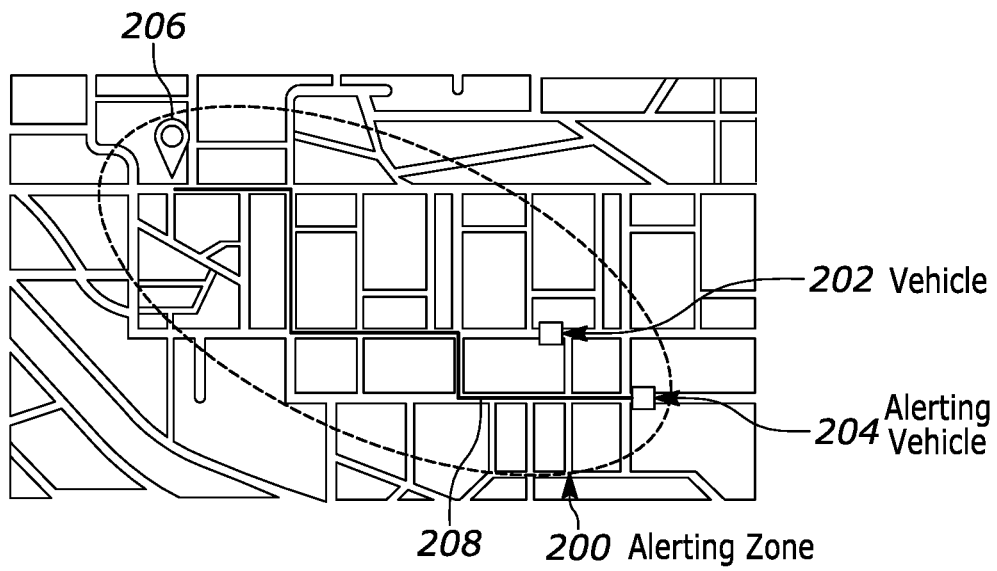
FIG. 2B depicts an example of a vehicle located in an alerting zone.

FIG. 2B depicts an example of the vehicle 202 being located in the alerting zone 200. In the example shown illustrated in FIG. 2B, the alerting zone 200 includes the alerting vehicle 204, the projected path 208 of the alerting vehicle, and the destination 206 of the alerting vehicle as described with reference to FIG. 2A. In contrast to FIG. 2A, the vehicle 202 shown in FIG. 2B is located in the alerting zone 200. Because the vehicle 202 is located in the alerting zone 200, the safety cloud determines that the vehicle needs to be alerted about the presence of the alerting vehicle 204. Thus, an alerting message is sent to the vehicle 202.

An example that illustrates the flow of data within a safety system, which is similar to the safety system 100 described with reference to FIG. 1, is described herein with reference to FIG. 3A-3E.

Figure 3A:
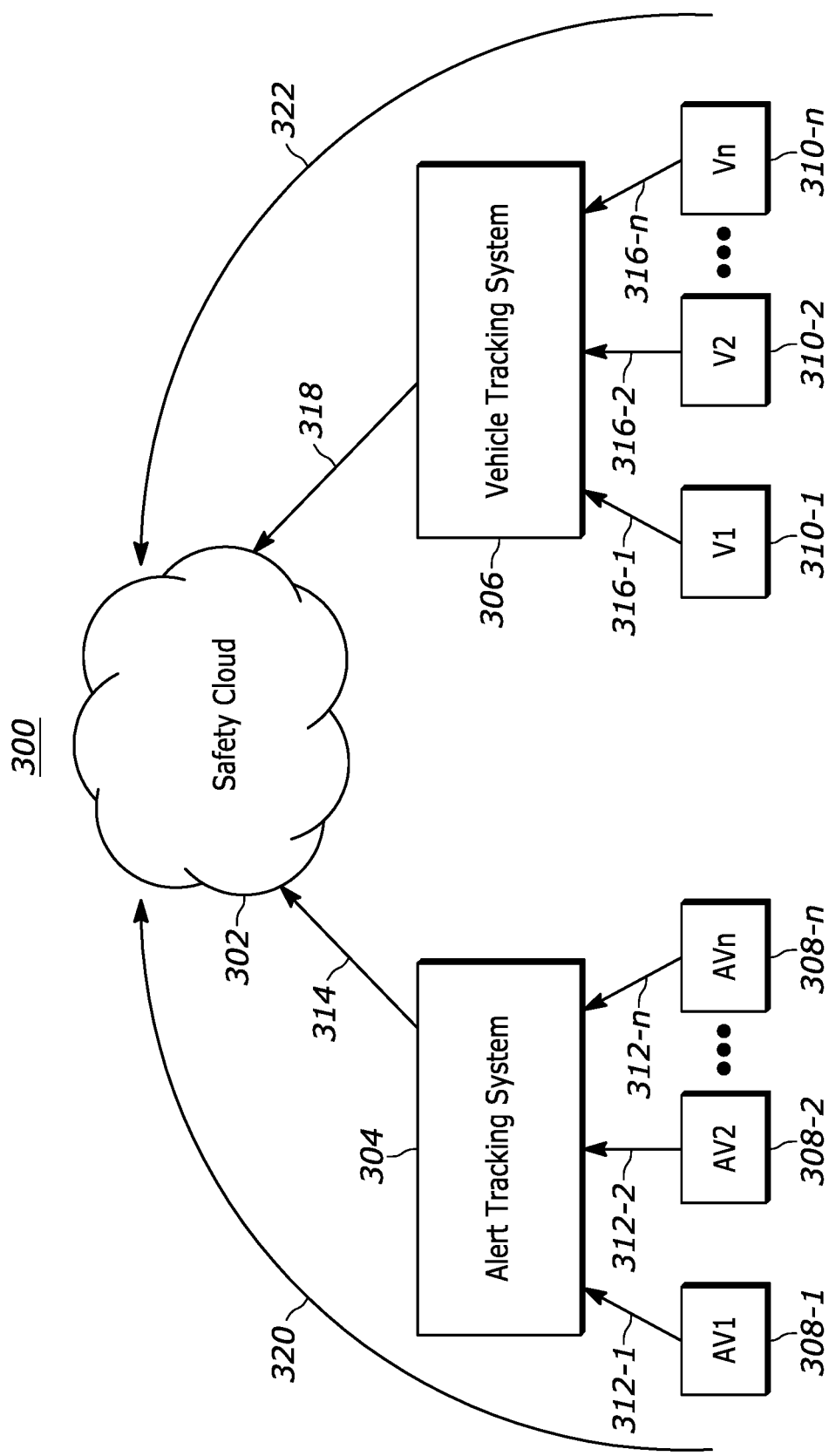
FIG. 3A illustrates the flow of data to a safety cloud.

FIG. 3A illustrates the flow of data to a safety cloud. The flow of data to the safety cloud may represent a process for collecting data (e.g., from alerting vehicles and from non-alerting vehicles). In particular, the example of FIG. 3A illustrates a safety system 300 that includes a safety cloud 302, an alert tracking system 304 that communicates with alerting vehicles AV1 308-1, AV2 308-2, and/or AVn 308-$n$, and a vehicle tracking system 306 that communicates with vehicles V1 310-1, V2 310-2, and/or Vn 310-$n$ as described with reference to FIG. 1. The example of FIG. 3A illustrates the flow of data to the safety cloud 302. In an embodiment, alerting vehicles AV1 308-1, AV2 308-2, and/or AVn 308-$n$ share alerting vehicle telemetry data with the alert tracking system 304 via wireless connections (represented by arrows 312-1, 312-2, and 312-$n$). In an example, the alerting vehicle telemetry data may include a vehicle ID, an alerting status (e.g., lights on/off), location information at a particular time (e.g., a timestamp and latitude and longitude coordinates), speed, acceleration, trajectory, direction, and/or azimuth, and an alert ID that corresponds to an alerting status/mode of an alerting vehicle. The alert tracking system 304 shares the alerting vehicle telemetry data with the safety cloud 302 (represented by arrow 314). In an embodiment, vehicles V1 310-1, V2 310-2, and/or Vn 310-$n$ share vehicle telemetry data with the vehicle tracking system 306 at regular intervals (e.g., every 2 seconds) via wireless connections (represented by arrows 316-1, 316-2, and 316-$n$). In an example, the alerting vehicle telemetry data may include a vehicle ID, location information (e.g., timestamp and latitude and longitude coordinates), speed, acceleration, trajectory, direction, and/or azimuth. The vehicle tracking system 306 shares the vehicle telemetry data with the safety cloud 302 (represented by arrow 318).

In some embodiments, alerting vehicles AV1 308-1, AV2 308-2, and/or AVn 308-$n$ share alerting vehicle telemetry data directly with the safety cloud 302 (represented by arrow 320), and/or vehicle V1 310-1, V2 310-2, and/or Vn 310-$n$ share vehicle telemetry data directly with the safety cloud 302 (represented by arrow 322). In such an embodiment, alerting vehicles AV1 308-1, AV2 308-2, and/or AVn 308-$n$ share alerting vehicle telemetry data directly with the safety cloud 302 by bypassing the alert tracking system 304, and vehicles V1 310-1, V2 310-2, and/or Vn 310-$n$ share vehicle telemetry data directly with the safety cloud 302 by bypassing the vehicle tracking system 306.

Although the alert tracking system 304 is described as sharing alerting vehicle telemetry data from alerting vehicles AV1 308-1, AV2 308-2, and/or AVn 308-$n$, the alert tracking system may also share vehicle telemetry data from other vehicles or devices (e.g., a roadside vehicle, a roadside sensor, a maintenance vehicle, a construction site device, drawbridge warning lights, railroad crossing gate/lights etc.). Additionally, the alerting vehicle telemetry data may correspond to other alert-related data such as, for example, a weather hazard, a lane closure, a road obstruction, a construction site, traffic, etc. In some embodiments, other parties may have access to the alert tracking system 304, such that the other parties (e.g., construction teams, utility teams, weather tracking teams, etc.) may tap into the alert tracking system and input/send alert-related data to the safety cloud 302 to indicate a safety hazard and/or an alerting zone. In such an embodiment, the other parties may input alert-related data that includes a specific location (e.g., an address or longitude and latitude coordinates) and/or a zone and an alert status (e.g., construction active, drawbridge up, railroad crossing gate down) to indicate the safety hazard and/or the alerting zone.

FIG. 3B is an example of a vehicle data message 330 that is used to communicate vehicle telemetry data from a vehicle (V1 310-1, V2 310-2, . . . . Vn 310-$n$) to the vehicle tracking system 306 and/or to the safety cloud 302. In the example, the vehicle data message 330 includes three fields, implemented as a vehicle ID field 332, a location information field 334, and a supplemental information field 336. The vehicle ID field 332 may indicate a vehicle ID (e.g, a 17-digit vehicle ID number (VIN)) that is unique to each vehicle (e.g., V1 310-1, V2 310-2, and/or Vn 310-$n$). The location information field 334 may indicate location information that corresponds to the location of the vehicle at a particular time, e.g., timestamp and latitude and longitude coordinates as provided from an on-vehicle GPS receiver). The supplemental information field 606 may include, for example, data indicative of motion of the vehicle such as speed, acceleration, trajectory, direction, and/or azimuth of the vehicle. Although the vehicle data message 330 is shown in FIG. 3B as including three fields, the vehicle data message may have more than or less than three fields that indicate the same or different information. In an embodiment, the vehicle data message 330 is sent by a vehicle (e.g., V1 310-1, V2 310-2, and/or Vn 310-*n*) to the vehicle tracking system 306 at regular intervals (e.g., every 2 seconds) via a wireless service provider network, and then shared with the safety cloud 302 by the vehicle tracking system. In another embodiment, the vehicle data message 330 is sent by a vehicle directly to the safety cloud via a wireless service provider network.

FIG. 3C is an example of an alerting vehicle data message 340 that is used to communicate alerting vehicle telemetry data from an alerting vehicle (AV1 308-1, AV2 308-2, . . . . AVn 308-*n*) to the alert tracking system 304 and/or to the safety cloud 302. In the example, the alerting vehicle data message 340 includes four fields, implemented as a vehicle ID field 342, a location information field 344, a supplemental information field 346, and an alert ID field 348. The vehicle ID field 342 may indicate a unique vehicle ID (e.g, a 17-digit vehicle ID number (VIN)) that corresponds to an alerting vehicle (e.g., AV1 308-1, AV2 308-2, and/or AVn 308-*n*). The location information field 344 may indicate location information that corresponds to the location of the vehicle (e.g., latitude and longitude coordinates as provided from an on-vehicle GPS receiver). The supplemental information field 346 may include, for example, data indicative of motion of the vehicle such as speed, acceleration, trajectory, direction, and/or azimuth of the vehicle. The alert ID field 348 may include an alert ID that indicates an alerting mode of the vehicle, e.g., whether the alerting vehicle has its emergency lights on or off and/or has its emergency siren on or off. Although the alerting vehicle data message 340 is shown in FIG. 3C as including four fields, the alerting vehicle data message may have more than or less than four fields that indicate the same or different information. In an embodiment, the alerting vehicle data message 340 is sent by an alerting vehicle (e.g., AV1 308-1, AV2 308-2, and/or AVn 308-*n*) to the alert tracking system 304 via a wireless service provider network, and then shared with the safety cloud 302 by the alert tracking system. In another embodiment, the alerting vehicle data message 340 is sent by an alerting vehicle directly to the safety cloud 302 via a wireless service provider network.

Figure 3D:
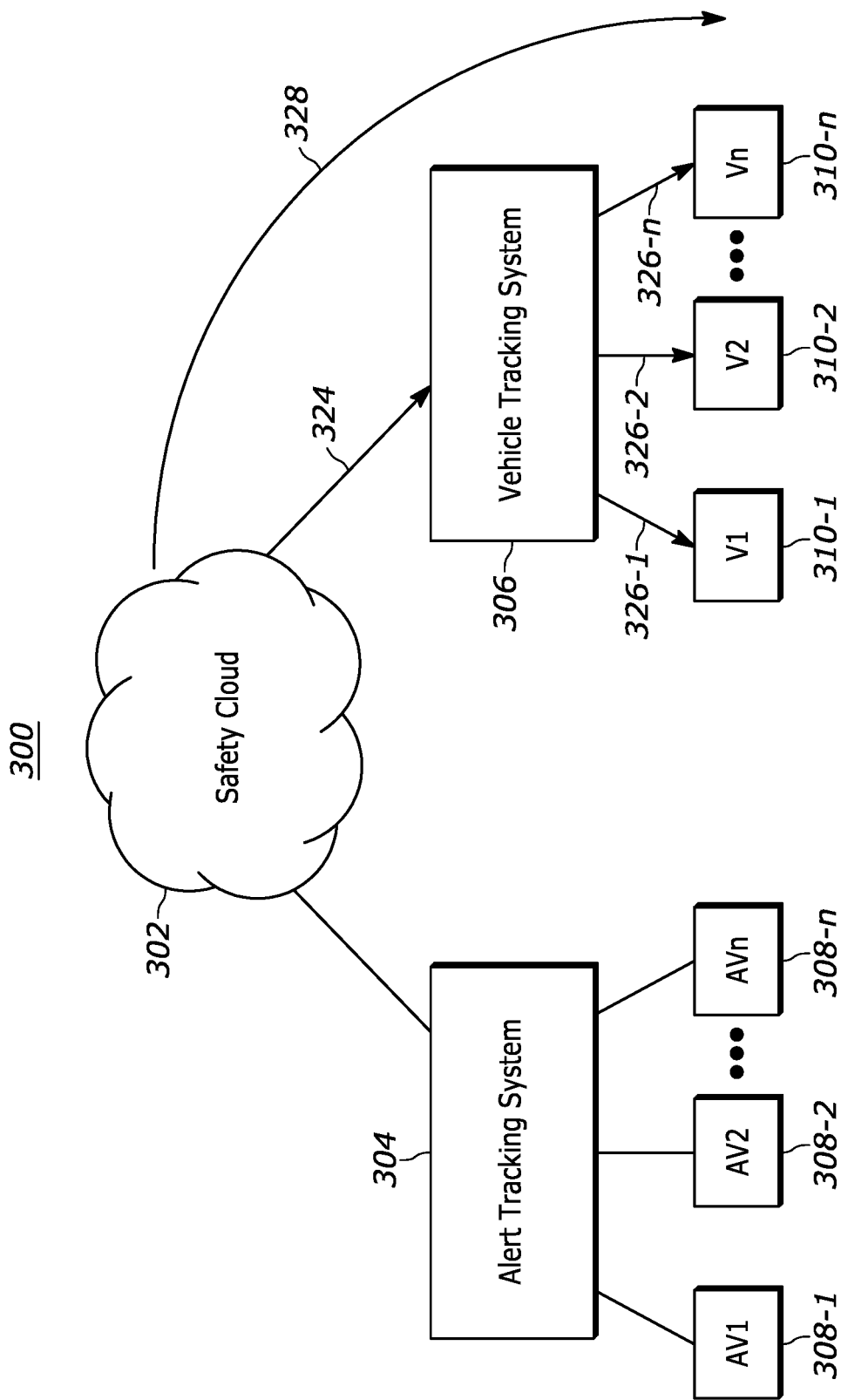
FIG. 3D illustrates the flow of data to vehicles from the safety cloud.

FIG. 3D illustrates the flow of data to vehicles. The flow of data to the vehicles may represent a process for sending alerts to the vehicles (V1 310-1, V2 310-2, and/or Vn 310-*n*). In particular, the example of FIG. 3D illustrates the safety system 300, including the safety cloud 302, the alert tracking system 304 that communicates with alerting vehicles AV1 308-1, AV2 308-2, and/or AVn 308-*n*, and the vehicle tracking system 306 that communicates with vehicles V1 310-1, V2 310-2, and/or Vn 310-*n* as described with reference to FIG. 3A. In contrast to FIG. 3A, the example of FIG. 3D illustrates the flow of data (e.g., alert messages) from the safety cloud 302 to the vehicles V1 310-1, V2 310-2, and/or Vn 310-*n*. The safety cloud 302 may generate an alert message for transmission to vehicles V1 310-1, V2 310-2, and/or Vn 310-*n* when a vehicle is within an alerting zone. In an example, the safety cloud 302 sends an alerting message to the vehicle tracking system 306 (represented by arrow 324) and the vehicle tracking system 306 sends an alert message to corresponding vehicles V1 310-1, V2 310-2, and/or Vn 310-*n* via wireless connections (represented by arrows 326-1, 326-2, and 326-*n*). In another example, the safety cloud 302 sends an alert message directly to a corresponding vehicle V1 310-1, V2 310-2, and/or Vn 310-*n* via a wireless connection (represented by arrow 328). In some embodiments, the same alert message is sent to all the vehicles that are included in the safety system 300 and within an active alerting zone. In some embodiments, an alert message is vehicle-specific, such that a different vehicle-specific alert message is sent to each of the vehicles that is within an alerting zone.

Figure 3E:
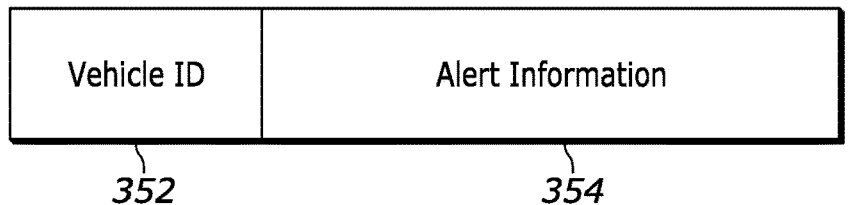
FIG. 3E depicts an example of an alert message that is generated by the safety cloud.

FIG. 3E depicts an example of an alert message 350 that is generated by the safety cloud 302. In the example, the alert message 350 shown in FIG. 3E includes two fields, implemented as a vehicle ID field 352 and an alert information field 354. The vehicle ID field 352 may indicate a vehicle ID that is unique to each vehicle (e.g., V1 310-1, V2 310-2, and/or Vn 310-*n*), such that the vehicle ID is vehicle-specific. By using the vehicle ID, the alert message indicates which particular vehicle the alert message is intended for. Thus, the vehicle ID may improve the overall impact of alert messages because only the intended vehicle will recognize the alert as being intended specifically for that vehicle. The alert information field 354 may indicate an alert type. In one example, the alert information field 354 may be a single bit field and in other examples, the alert information field 354 may be a multibit field. In one example, there may be multiple different types of alert messages and in another example, there is only one type of alert message. In an embodiment, the alert information field 354 has a value that indicates a warning such as "beware of hazard," "fire truck ahead," "police car ahead," "tow truck ahead," "lane closure ahead," "construction ahead," or the like. Although the alert message 350 is shown in FIG. 3E as including two fields, the alert message may have more than or less than two fields that indicate the same or different information. In an embodiment, the alert message 350 is sent to the vehicle tracking system 306 by the safety cloud 302, and then sent by the vehicle tracking system to a transceiver of a vehicle (e.g., V1 310-1, V2 310-2, and/or Vn 310-*n*) via a wireless service provider network. In another embodiment, the alert message 350 is sent by the safety cloud to the transceiver of the vehicle via the wireless service provider network. In yet another embodiment, the alert message 350 is sent by the safety cloud to a broadcasting tower near an alerting zone via the wireless service provider network, and then sent by the broadcasting tower to the transceiver of the vehicle via a wireless service provider network.

Figure 4A:
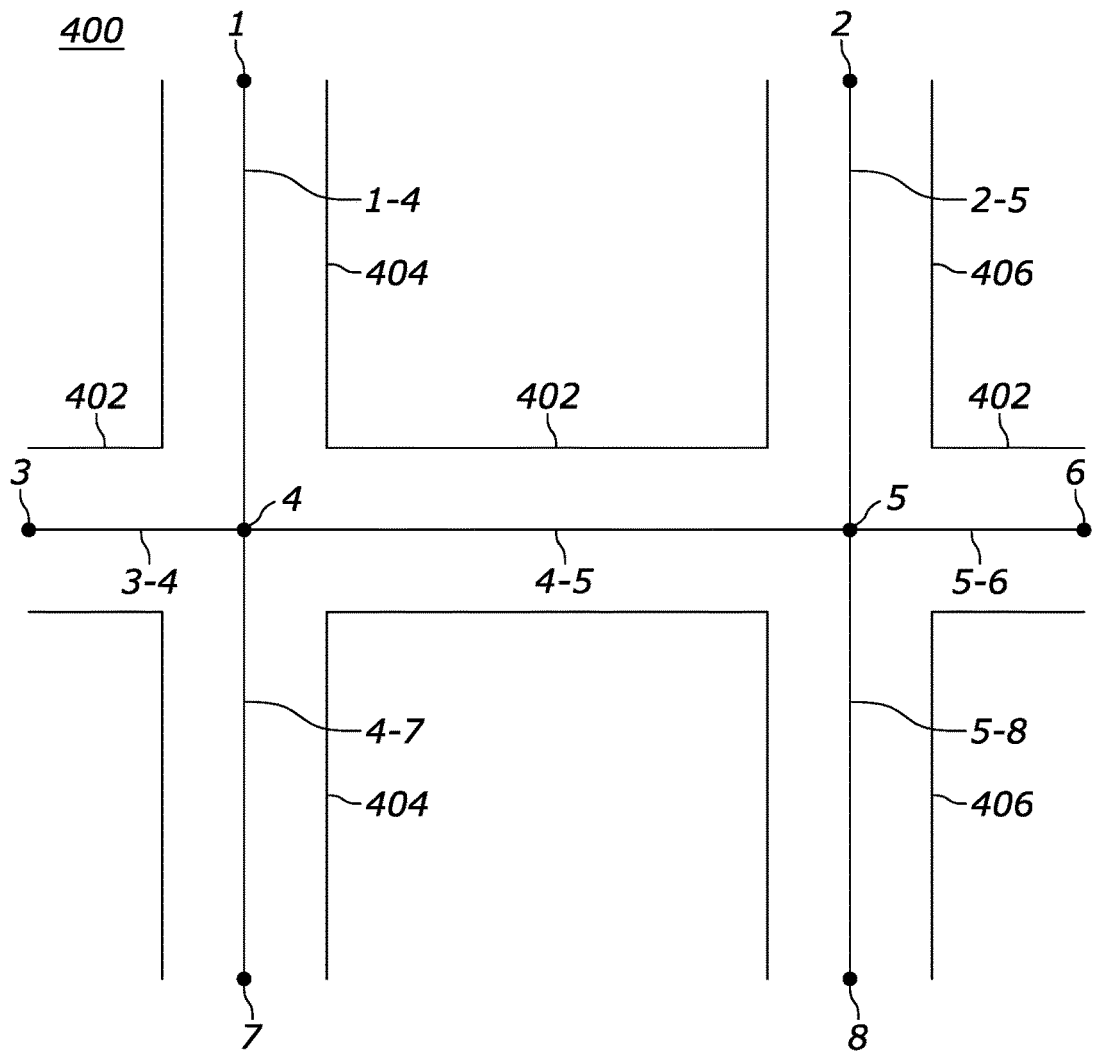
FIG. 4A illustrates a road network.

As described above, the safety cloud (e.g., FIG. 1, 102, FIGS. 3A/3B, 302) utilizes vehicle telemetry data related to both alerting vehicles (e.g., AV1, AV2, . . . . AVn) and non-alerting vehicles (V1, V2, . . . . Vn) to make decisions about alerting. In the field of digital maps, map data models based on nodes and links are being developed. In node/link based map data models, links correspond to segments of roads and nodes correspond to intersections between segments of roads. Nodes are identified in the digital map by unique node IDs and links are identified in the digital map by unique link IDs. FIG. 4A illustrates a road network 400 that includes three roads in which a first road 402 (running horizontally in FIG. 4A) is intersected by a second road 404 (running vertically in FIG. 4A) and a third road 406 (also running vertically in FIG. 4A). In a node/link based map data model for a digital map, the nodes in the road map of FIG. 4A may be identified by node IDs 1, 2, 3, 4, 5, 6, 7, and 8, and the links in the road map of FIG. 4A may be identified by link IDs 1-4, 2-5, 3-4, 4-5, 5-6, 4-7, and 5-8, where the link IDs are formed from the node IDs of two ends of the segment. Although an example of one form of link ID is described, other forms of unique link IDs are possible. In an example, a node/link based map data model for a digital map may assign nodes and/or links directionally. In such an example, an eastbound lane of a road may have a different link ID than a westbound lane of the same road at the same position along the road (e.g., at the same longitude coordinate).

As described above with reference to FIGS. 2A and 2B, some conventional vehicle alerting systems implement alerting zones that are expressed or defined in terms of geographical coordinates (e.g., latitude and longitude coordinates) and/or some distance around a position and/or a projected path of a vehicle. While such techniques for defining alerting zones enable a zone-based vehicle alerting system, the techniques may consume significant computing resources to generate alerting zones and to track and project the positions of large numbers of vehicles relative to the alerting zone. It has been realized that node/link based map models can be leveraged to track a large number of vehicles and to quickly and efficiently determine whether or not the tracked vehicles should be alerted to a potential hazard. For example, vehicle locations (e.g., both the current location and predicted paths) are tracked in terms of nodes and links on a digital map, alerting zones are defined in terms of nodes and links on the digital map, and alerting decisions are made by comparing the nodes and/or links of an alerting zone to the nodes and/or links of vehicles that are being tracked. A vehicle that is being tracked can be alerted of a possible hazard when a node and/or link corresponding to the vehicle matches a node and/or link of the alerting zone. In an example, a technique for alerting vehicles involves populating a database with vehicle entries, the vehicle entries in the database including a vehicle identifier (ID) and at least one of a node ID and a link ID that correspond to a digital map that uses a map data model with node IDs and link IDs, and initiating an alert messaging operation corresponding to a vehicle ID of a vehicle entry in the database in response to a match between a search key and at least one of the node ID and the link ID of the vehicle entry, wherein the search key includes at least one of a node ID and a link ID. In an example, the technique is implemented in a safety cloud that receives alerting vehicle telemetry data and non-alerting vehicle telemetry data as described above.

Using the node and link-based alerting approach in a cloud-based safety system, a database of a large number of vehicles can be easily maintained and rapidly searched by node and/or link IDs to identify vehicles that should be alerted. Implementing such a technique may involve map matching of vehicle location information (e.g., latitude and longitude coordinates) to a node ID and/or link ID of a digital map and projecting or predicting the most probable paths of vehicles in terms of node IDs and/or link IDs using vehicle telemetry data (e.g., location, speed, and direction) and defining an alerting zone in terms of node IDs and/or link IDs, which may also involve map matching of alerting vehicle location information (e.g., latitude and longitude coordinates) to a node ID and/or link ID and predicting or projecting a most probable path of the alerting vehicle in terms of node IDs and/or link IDs based on vehicle telemetry data (e.g., location, speed, and direction).

Figure 4B:
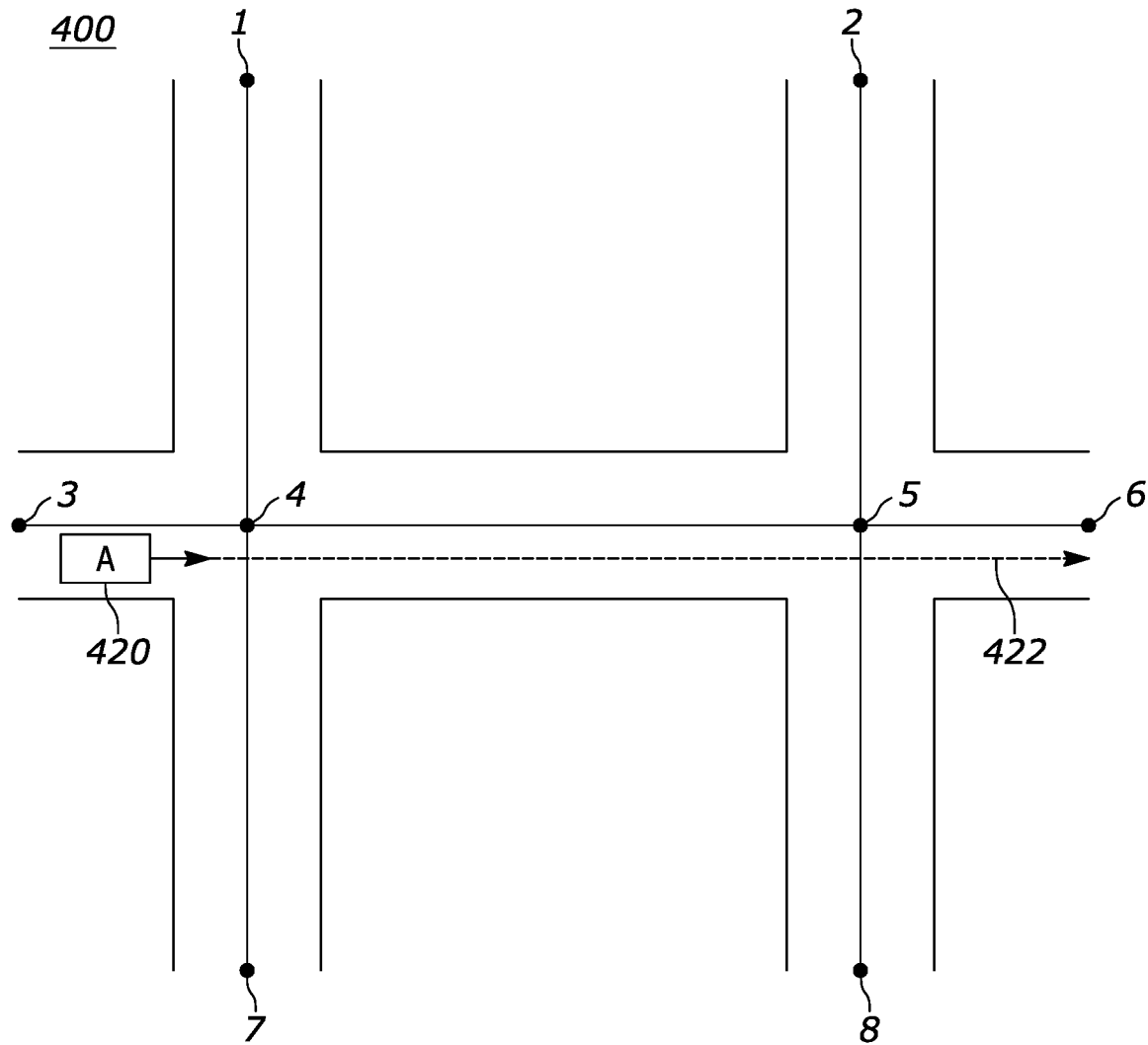
FIG. 4B illustrates an example process of map matching and most probable path prediction in terms of nodes and links.

As described above, utilizing a node/link based map data model for vehicle alerting may involve map matching of location information (e.g., latitude and longitude coordinates) to a node/link based map data model and making most probable path predictions in terms of nodes and links. FIG. 4B illustrates an example process of map matching and most probable path prediction in terms of nodes and links. The road network 400 shown in FIG. 4B is the same as the road network 400 shown in FIG. 4A with the addition of a vehicle, A 420, being located on one of the roads. For example purposes, it is assumed that the vehicle has provided vehicle telemetry data to a safety cloud at regular intervals (e.g., every 2 seconds), with the vehicle telemetry data including location information (e.g., timestamp and latitude and longitude coordinates), and some motion information such as velocity and direction information. In another example, motion information can be calculated at the safety cloud from the location information. In a map matching process, the location information is used to map the vehicle to particular node and/or link on the road network. In an example, known techniques for map matching to a node/link based map data model are implemented by the safety cloud. In the example of FIG. 4B, the vehicle is mapped to the link having link ID 3-4. That is, the vehicle is mapped to a segment of road that is identified by link ID 3-4. In a most probable path prediction process, the location information, the velocity information, and the direction information from the vehicle telemetry data are used to identify node ID(s) and/or link ID(s) that correspond to the most probable path of the vehicle. In an example, the most probable path of a vehicle is predicted and the result of the prediction is a line segment, or segments, that covers some portion of a road or roads and includes multiple points that make up the line. The points in the line segment are then matched to node IDs and/or link IDs to generate the set of node ID(s) and/or link ID(s) that correspond to the predicted most probable path of the vehicle. There are many different ways to predict the most probable path of a vehicle which can be applied to the vehicle alerting technique described herein. In an example, the most probable path prediction process involves implementing an A-star (or A*) algorithm to predict the most probable path of the vehicle. For example, an A-star algorithm may be implanted to predict a most probable path when the current location and the ultimate destination of the vehicle are known. Different variations of an A-star algorithm may be used to predict the most probable path of the vehicle. Alternatively, other path prediction algorithms may be used to predict the most probable path of a vehicle. For example, the most probable path prediction process may involve considering a set of attributes that are weighted relative to each other. For example, attributes to consider in a most probable path prediction may include road functional class, road speed limit, road restrictions, vehicle speed, vehicle direction. In an example, the most probable path is predicted for some specific time interval. For example, the most probable path of a vehicle may be predicted for the next X number of seconds, where X is in integer of one or more. In one example, the time interval is in the range of 10-40 seconds, and in another example, the interval is 20 seconds, or approximately 20 seconds (e.g., ±10%), although other time intervals are possible. For example, the most probable path of a vehicle is predicted for the next 20 seconds based on a number of attributes, such as the attributes described above. In an example, the time interval may depend on factors such as the speed of the vehicle, the density of traffic, road conditions, weather conditions, setting (e.g., urban, residential, rural), whether or not the destination of the vehicle is known or unknown. In an example, the most probable path may include multiple possible paths of a vehicle. For example, if the vehicle is approaching an intersection, the most probable path may include sections of roads (e.g., expressed as link IDs) that cover multiple possible paths that the vehicle could take.

The process of predicting the most probable path of vehicles is continuously repeated within the safety cloud. For example, the process may be repeated for a particular vehicle each time vehicle telemetry data is received at the safety cloud for that vehicle. Thus, in a case where vehicle telemetry data is received every 2 seconds, the most probable path of a vehicle can be updated every 2 seconds. In an example, the most probable path of every vehicle that is being tracked by the alert tracking system and/or the vehicle tracking system is predicted upon receipt of vehicle telemetry data for that vehicle.

In the example of FIG. 4B, the most probable path of the vehicle, expressed in terms of node ID(s) and/or link ID(s), includes node IDs 4, 5, and 6, and link IDs 3-4, 4-5, and 5-6. FIG. 4B also illustrates the most probable path with a dashed line 422. Although in the example of FIG. 4B, the most probable path is only along one road, the most probable path could include multiple possible paths. For example, the set of node ID(s) and/or link ID(s) that correspond to the most probable path of the vehicle could also include link IDs 1-4, 4-7, 2-5, and/or 5-8 depending on specifics of the most probable path prediction. Additionally, in a case in which node ID(s) and/or link ID(s) are direction-specific, a most probable path prediction may take into account directionality in generating the set of node ID(s) and/or link ID(s). For example, in some circumstances it may be desirable to alert vehicles traveling in both directions on a road segment. Thus, the set of node ID(s) and link ID(s) generated from the most probable path prediction for an alerting vehicle may include node ID(s) and/or link ID(s) that correspond to both directions of travel on a road. In contrast to an alerting vehicle, the set of node ID(s) and link ID(s) generated from the most probable path prediction for a non-alerting vehicle may only include node ID(s) and/or link ID(s) that correspond to the predicted direction of travel of the non-alerting vehicle. As will be explained below with reference to FIG. 5, information related to a vehicle may be used to populate a database that includes entries having a vehicle ID and the set of node ID(s) and/or link ID(s) that correspond to the most probable path of the vehicle. The map matching and most probable path prediction processes may be implemented for all vehicles that are tracked by the cloud system and entries corresponding to each of the vehicles may be maintained in the database.

Figure 4C:
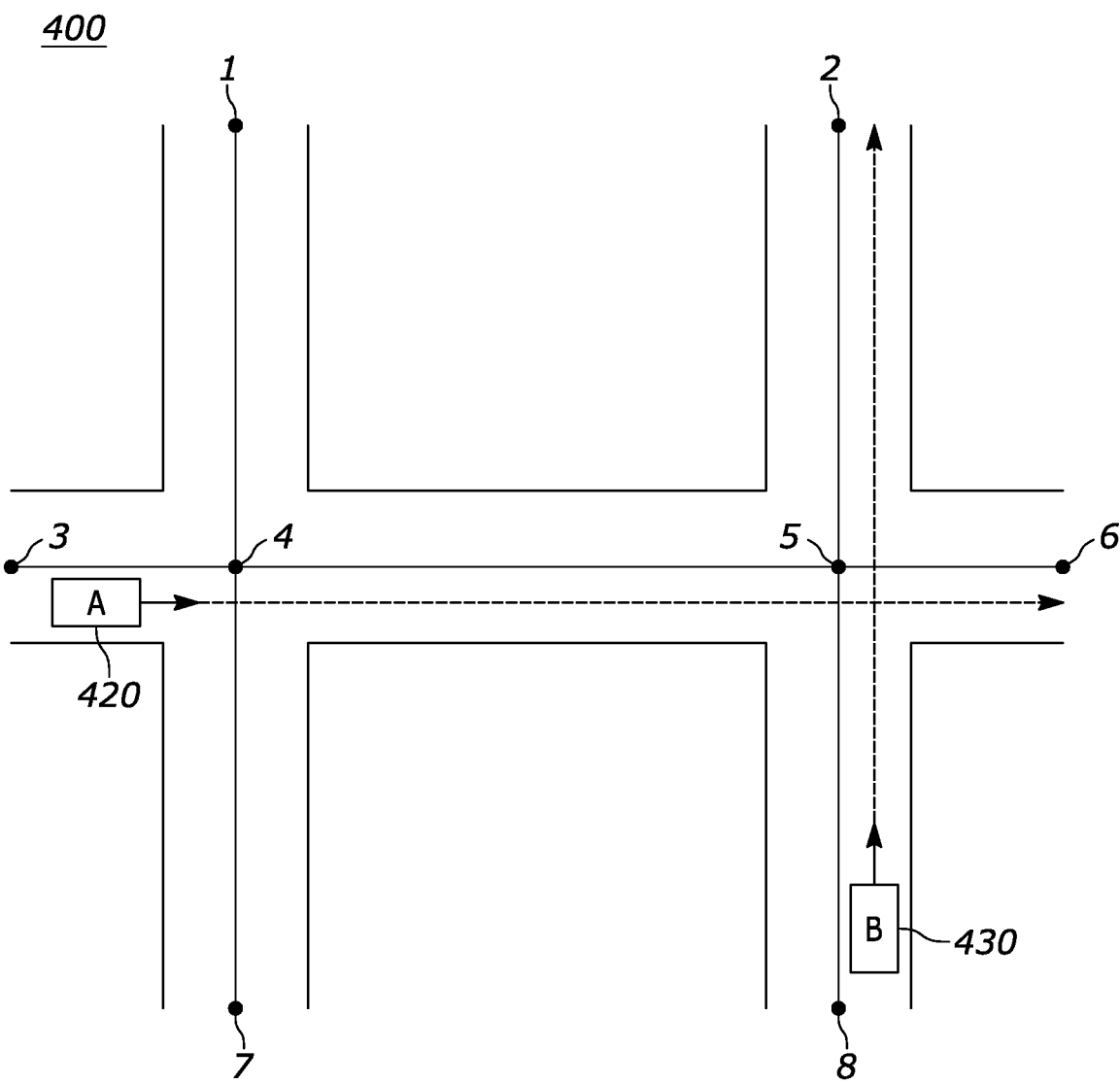
FIG. 4C illustrates an example of two vehicles on the road network that have matching nodes in their respective sets of node ID(s) and/or link ID(s).

As described above, the node/link based alerting system makes decisions on vehicle alerting based on matching node/link IDs. FIG. 4C illustrates an example of two vehicles 420 and 430 on the road network 400 that have matching nodes in their respective sets of node ID(s) and/or link ID(s). With reference to FIG. 4C, based on vehicle telemetry data received from vehicle A, vehicle A is mapped to link 3-4 and the set of node ID(s) and/or link ID(s), which is determined from a most probable path prediction, includes the set of:
 node IDs: 4, 5, 6; and
 link IDs: 3-4, 4-5, 5-6.
Based on vehicle telemetry data received from vehicle B 430, vehicle B is mapped to link 5-8 and the set of node ID(s) and/or link ID(s), which is determined from a most probable path prediction, includes the set of:
 node IDs: 5, 2; and
 link IDs: 5-8, 2-5.

A comparison of the set of node ID(s) and/or link ID(s) corresponding to vehicle A 420 to the set of node ID(s) and/or link ID(s) corresponding to vehicle B 430 finds that node 5 is common to both vehicles. As is described further below, the match of node 5 between the two sets of node ID(s) and/or link ID(s) can trigger an alerting operation.

Figure 4D:
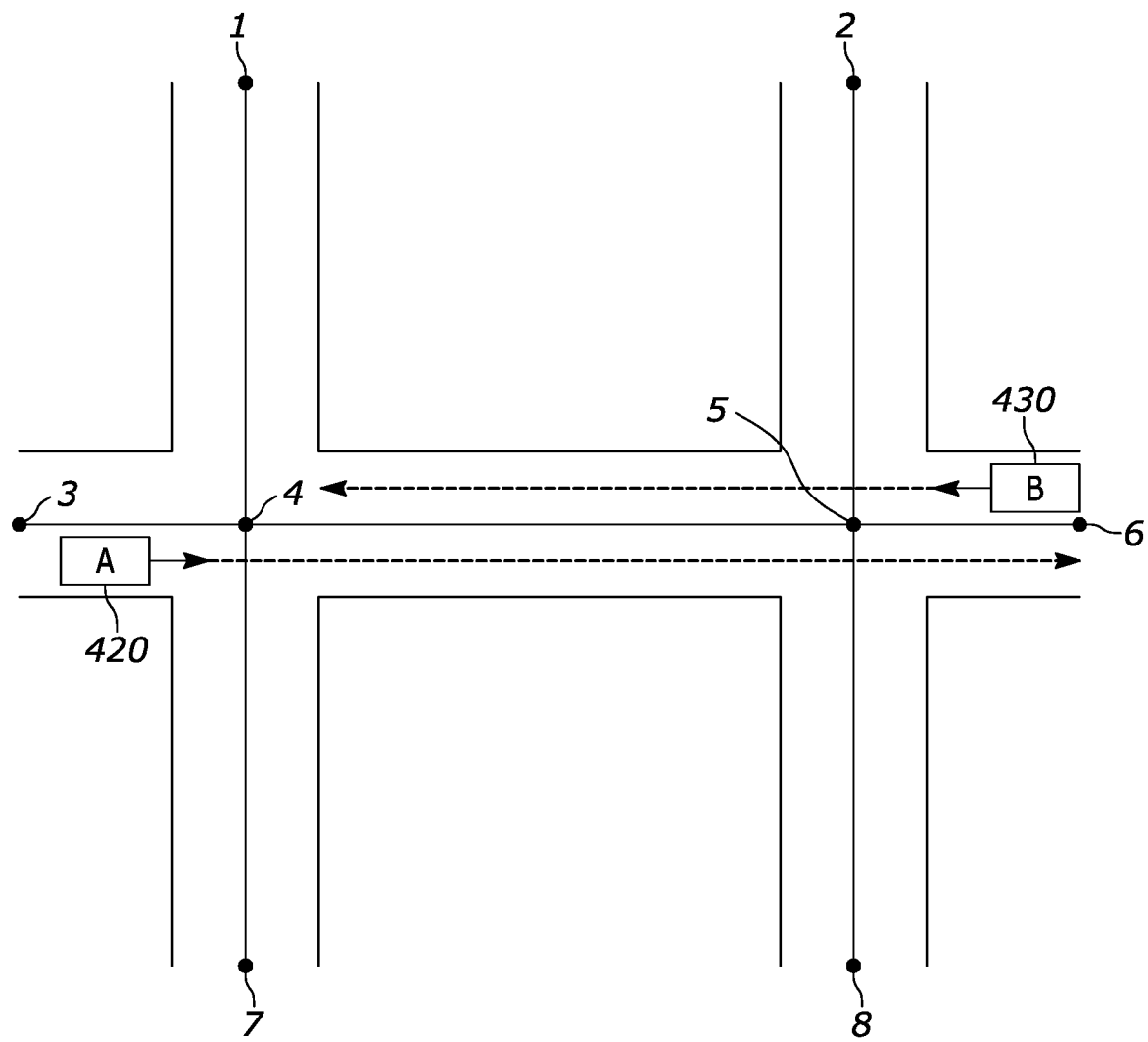
FIG. 4D illustrates an example of two vehicles on the road network that have matching links in their respective sets of node ID(s) and/or link ID(s).

FIG. 4D illustrates an example of two vehicles 420 and 430 on the road network 400 that have matching links in their respective sets of node ID(s) and/or link ID(s). With reference to FIG. 4D, based on vehicle telemetry data received from vehicle A 420, vehicle A is mapped to link 3-4 and the set of node ID(s) and/or link ID(s), which is determined from a most probable path prediction, includes the set of:
 node IDs: 4, 5, 6; and
 link IDs: 3-4, 4-5, 5-6.
Based on vehicle telemetry data received from vehicle B 430, vehicle B is mapped to link 5-6 and the set of node ID(s) and/or link ID(s), which is determined from a most probable path prediction, includes the set of:
 node IDs: 4, 5, and
 link IDs: 4-5, and 5-6.

A comparison of the set of node ID(s) and/or link ID(s) corresponding to vehicle A 420 to the set of node ID(s) and/or link ID(s) corresponding to vehicle B 430 finds that nodes 4 and 5 are common to both vehicles and that links 4-5 and 5-6 are common to both vehicles. As is described further below, the match of nodes 4 and 5 and links 4-5 and 5-6 between the two sets of node ID(s) and/or link ID(s) can trigger an alerting operation.

Figure 4E:
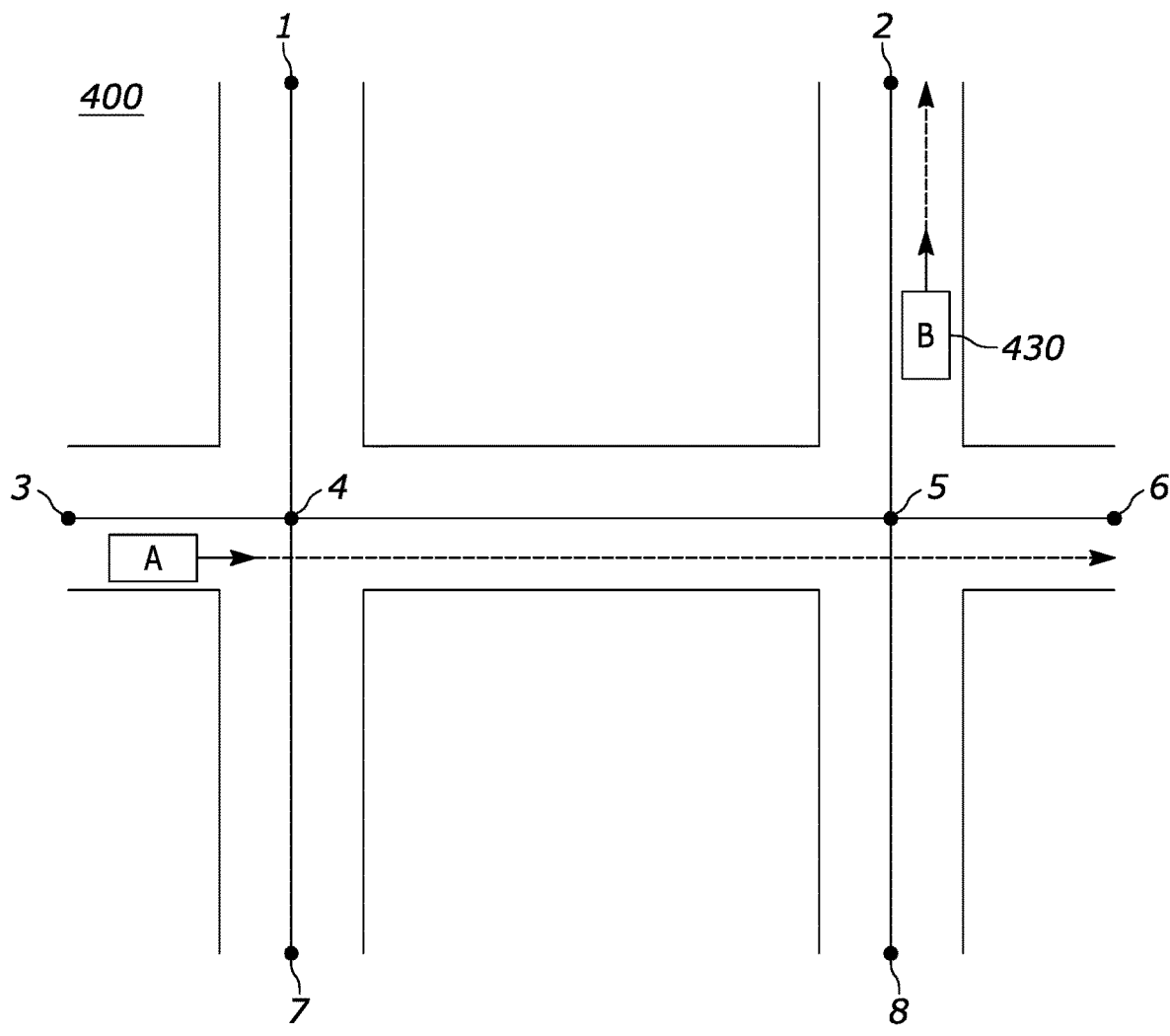
FIG. 4E illustrates an example of two vehicles on the road network that have no matching nodes or links in their respective sets of node ID(s) and/or link ID(s).

FIG. 4E illustrates an example of two vehicles 420 and 430 on the road network 400 that have no matching nodes or links in their respective sets of node ID(s) and/or link ID(s). With reference to FIG. 4E, based on vehicle telemetry data received from vehicle A 420, vehicle A is mapped to link 3-4 and the set of node ID(s) and/or link ID(s), which is determined from a most probable path prediction, includes the set of:
 node IDs: 4, 5, 6; and
 link IDs: 3-4, 4-5, 5-6.
Based on vehicle telemetry data received from vehicle B 430, vehicle B is mapped to link 2-5 and the set of node ID(s) and/or link ID(s), which is determined from a most probable path prediction, includes the set of:
 node IDs: 2; and
 link IDs: 2-5.

A comparison of the set of node ID(s) and/or link ID(s) corresponding to vehicle A 420 to the set of node ID(s) and/or link ID(s) corresponding to vehicle B 430 finds that there are no nodes and no links in common to both vehicles. As is described further below, because no matching between nodes and/or links between the two sets of node ID(s) and/or link ID(s), an alerting operation is not triggered.

FIG. 5 is a process flow diagram of a process for generating entries in a vehicle tracking database that utilizes node IDs and link IDs of a node/link based map data model. At block 502, vehicle telemetry data is received. For example, the vehicle telemetry data includes a vehicle ID, location information (e.g., timestamp and latitude and longitude coordinates as provided by an on-vehicle GPS receiver), and motion information such as velocity, acceleration, trajectory, direction and/or azimuth. In an example, vehicle telemetry data is generated by the vehicles and received at the safety cloud on regular intervals (e.g., every 2 seconds). In some examples, the frequency of vehicle telemetry reporting may be adjusted based on the proximity of a vehicle to an alerting zone.

At block 504, the vehicle telemetry data is used in a map matching process. In an example, the map matching process involves matching location information (e.g., latitude and longitude coordinates) of the vehicle to a node and/or link of a digital map. For example, if the location information corresponds to a particular intersection, then the map matching may output a particular corresponding node ID, or if the location information corresponds to a particular segment of a roadway, then the map matching may output a particular corresponding link ID. In an example, the map matching results in either a node ID or a link ID, and in other examples, the map matching may result in more than one node ID and/or link ID, or the map matching may result in a combination of node and link IDs. Techniques for map matching vehicles to a digital map that uses a node/link map model, which are known in the field, can be applied to the map matching process.

At block 506, an output of the map matching and the vehicle telemetry data are used to generate a most probable path prediction for the corresponding vehicle. Importantly, the most probable path prediction is expressed or defined as a set of node ID(s) and/or link ID(s). As described above, the most probable path prediction may involve various different path prediction techniques, including implementing an A-star (or A*) algorithm to predict the most probable path of the vehicle. As used herein, a set of node ID(s) and/or link ID(s) may include only one node ID, only one link ID, a node ID and a link ID, a single node ID and multiple link IDs, multiple node IDs and a single link ID, or some combination node IDs and link IDs. Although some examples of techniques for predicting a most probable path are described, other techniques for predicting a most probable path are possible.

At block 508, once the most probable path prediction, expressed as a set of node ID(s) and/or link ID(s), is generated, a corresponding vehicle entry can be populated in a vehicle tracking database. For example, the vehicle entry may include the vehicle ID and the set of node ID(s) and/or link ID(s).

As described above, sets of node ID(s) and/or link ID(s) can be compared to determine if there are any node ID(s) and/or link ID(s) in common (e.g., matching). FIG. 6 illustrates a table 600 of information about alerting vehicles and non-alerting vehicles. On the left side of the table are entries related to alerting vehicles and on the right side of the table are entries related to non-alerting vehicles (e.g., civilian vehicles). With reference to the right side of the table, there are entries for vehicles 1-N, where N is an integer of one or more. Each entry of non-alerting vehicles includes a vehicle ID and at least one node ID or link ID. In an example, a vehicle entry may include multiple node IDs and/or multiple link IDs depending on the most probable path prediction. In some implementations, the number of non-alerting vehicles that are simultaneously tracked may be in the hundreds or thousands.

With reference to the left side of the table 600 in FIG. 6, there are entries for alerting vehicles X and Y. Although two alerting vehicles are present on the left side of the table, there may be anywhere from zero to M alerting vehicles on the left side of the table at any one time, where M is an integer of one or more. In an example, alerting vehicles are added to the table only when an alerting vehicle is in an alerting mode. For example, an alerting mode may be indicated from an alert ID in received alerting vehicle telemetry data or from some other indication, e.g., from a central emergency vehicle command center. Each entry of an alerting vehicle includes a vehicle ID and at least one node ID or link ID. In an example, an alerting vehicle entry may include multiple node IDs and/or multiple link IDs depending on the most probable path prediction. In some implementations, the number of alerting vehicles that are simultaneously tracked may be in the hundreds or thousands. In one implementation, all vehicles in a fleet of vehicles (e.g., all police cars of a city police department or all fire trucks of a city fire department) are tracked, but a matching operation is only performed when an alerting vehicle is in an alerting mode (e.g., its emergency lights are on). In the example of FIG. 6, a match exists between alerting vehicle X and non-alerting vehicle 2. In particular, both alerting vehicle X and non-alerting vehicle 2 have node 5 in their respective sets of node ID(s) and/or link ID(s), similar to what is illustrated in FIG. 4C. In an example, the match will trigger an alerting operation that targets vehicle 2.

Information related to alerting vehicles and non-alerting vehicles, such as the information described with reference to FIG. 6, can be maintained in a computer database in various different ways. In one example, a database is maintained for the civilian/non-alerting vehicles and a separate database, or databases is maintained for alerting vehicles. In one example, a separate database can be maintained for different organizations that have alerting vehicles. For example, a database may be maintained for vehicles of a city fire department while a separate database is maintained for vehicles of the city police department. Likewise, separate databases may be maintained for different vehicle tracking entities. For example, a first database may be maintained for vehicle manufacturer A and a second database may be maintained for vehicle manufacture B and/or a first database may be maintained for vehicle fleet A and a second database may be maintained for vehicle fleet B.

In an example, a vehicle tracking database is maintained for vehicles that are being tracked by the safety cloud. FIG. 7 illustrates a vehicle tracking database 700 that includes multiple vehicle entries 702 with each vehicle entry including an entry ID 704, a vehicle ID 706, and any node IDs 708 and/or link IDs 710 that correspond to the vehicle ID. For example, the node IDs and/or link IDs are the set of node IDs and/or link IDs for a vehicle that are generated as described above with reference to FIG. 5. In an example, a database that includes the information as illustrated in FIG. 7 is maintained by the safety cloud and updated as vehicle telemetry data is received.

The vehicle tracking database 700 may be searched using a search key. For example, a search key may be a set of node ID(s) and/or link ID(s), in which the set of node ID(s) and/or link ID(s) may include only a node ID, only a link ID, a node ID and a link ID, a single node ID and multiple link IDs, multiple node IDs and a single link ID, or some combination node IDs and link IDs. In an example, the search key corresponds to a particular alerting vehicle that is currently in alerting mode. For example, a search key may correspond to a set of node ID(s) and/or link ID(s) of alerting vehicle X in FIG. 6. In another example, the search key may correspond to a static alert such as a construction site, a lane closure, or a pothole in the road. In some examples, the search/match process may involve checking every vehicle in the database against a set of "static" search keys and alerting accordingly. For example, if a construction site is represented by a particular set of node ID(s) and/or link ID(s), then, each time a vehicle has its most probable path prediction updated, the updated most probable path prediction (e.g., in terms of a set of node ID(s) and/or link ID(s)) is compared to the static search keys. In some examples, alerting vehicles could also be alerted themselves if their predicted most probable path has a node ID and/or link ID that matches with a search key, such as static search key or a search key that corresponds to another alerting vehicle.

In an example, a search key may be established when an alerting vehicle provides an alerting signal to the safety cloud. For example, an alerting vehicle provides an indication that is emergency lights are on. Upon receiving the alerting signal, the safety cloud implements the operations as described with reference to FIG. 5 to generate a set of node ID(s) and/or link ID(s) that correspond to the alerting vehicle. The set of node ID(s) and/or link ID(s) is used as the search key to search the vehicle tracking database for matches between any of the node ID(s) and/or link ID(s) in the set of node ID(s) and/or link ID(s) that form the search key and any of the node IDs and/or link IDs that correspond to the vehicle entries in the vehicle tracking database. FIG. 7 also illustrates a search key 720 that is used to search the vehicle tracking database. In an example, any vehicle entries that are found to have a node ID and/or link ID that matches the search key are used to initiate an alerting operation. For example, the vehicle IDs of any matching vehicle entries are sent to an alert messaging engine of the safety cloud.

In another example, the safety cloud may maintain a database of alerting vehicle tracking information similar what is described with reference to FIG. 7. Each time a non-alerting vehicle has its vehicle tracking information updated, the vehicle tracking information, expressed in part in terms of node IDs and/or link IDs, is compared to the database of alerting vehicle tracking information to see if there are any matching node and/or link IDs. Any vehicle that is found to have a matching node ID and/or link ID with an alerting vehicle in the alerting vehicle database can be sent to the alert messaging engine of the safety cloud to initiate an alerting operation.

Figure 8:
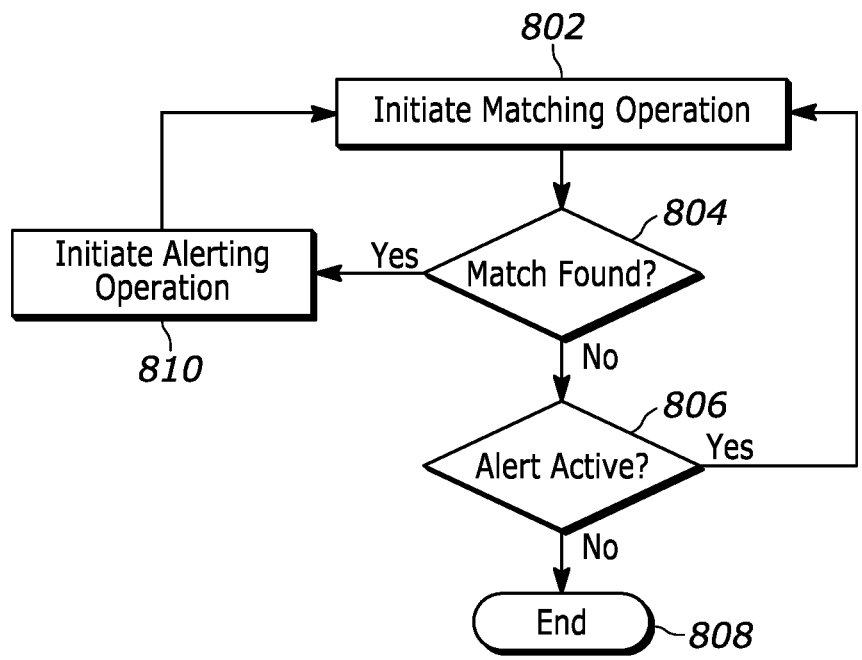
FIG. 8 is a process flow diagram of an example matching operation that may be implemented by a safety cloud.

In an example, a computing engine (e.g., combination of hardware and software) in the safety cloud is continuously maintaining a vehicle tracking database such as the vehicle tracking database described with reference to FIG. 7. When an alerting vehicle goes into an alerting mode, the vehicle includes an alert indicator in the alerting vehicle telemetry data that the vehicle is providing to the alert tracking system and/or to the safety cloud. In an example, once an alerting vehicle goes into an alerting mode, the safety cloud implements a matching operation. FIG. 8 is a process flow diagram of an example matching operation that may be implemented by the safety cloud. Once a vehicle provides an indication that it is in alerting mode to the safety cloud, at block 802, the safety cloud initiates a matching operation. For example, the most probable path of the alerting vehicle (e.g., in terms of a set of node ID(s) and/or link ID(s)) is used as a search key to search a database of vehicle information such as the database described with reference to FIG. 7. At decision point 804, it is determined if a match is found, e.g., a match between a search key that includes at least one node ID and/or link ID and any node IDs and/or link IDs in a vehicle tracking database. For example, the match operation may be implemented as described above with reference to FIGS. 6 and 7. If no match is found, then the process proceeds to decision point 806. At decision point 806, it is determined if the vehicle is still in an alerting mode (e.g., the alert is still active). For example, the alert received from an alerting vehicle may remain active until the safety cloud receives alerting vehicle telemetry data that does not have an alerting signal (e.g., does not have a "lights on" indicator) or the alert received from an alerting vehicle may remain active for a fixed period of time. Whether or not an alert is still active may be determined in other ways. If it is determined that the alert is still active, then the process proceeds to block 802, and another matching operation is initiated. If, however, it is determined that the alert is no longer active, then at block 808, the process ends. Returning to decision point 804, if it is determined that a match is found, then the process proceeds to block 810. At block 810, an alerting process is initiated. For example, a process of alerting a particular vehicle that corresponds to the matching vehicle entry is initiated. Further, in an example, the process of alerting is initiated for each vehicle entry for which a match is found. Thus, if one hundred vehicles are found to have a node ID and/or link ID that matches a node ID and/or link ID of the search key, then each of the one hundred vehicles is alerted of a potential hazard. In an example, the safety cloud generates a vehicle-specific alerting message for each of the one hundred vehicles. For example, a vehicle-specific alerting message may include the vehicle ID of the targeted vehicle. The vehicle-specific alerting messages may be provided to the vehicle tracking system for transmission to the corresponding vehicles. In another example, the vehicle tracking system may receive the vehicle-specific alerting messages, but may choose not to transmit an alerting message to the corresponding vehicle, or vehicles. Upon initiating an alerting operation, the process returns to block 802.

Examples of how a cloud-based system can be used to alert vehicles of potential hazards using a node/link based map data model as described herein is further illustrated with reference to FIGS. 9A and 9B.

Figure 9A:
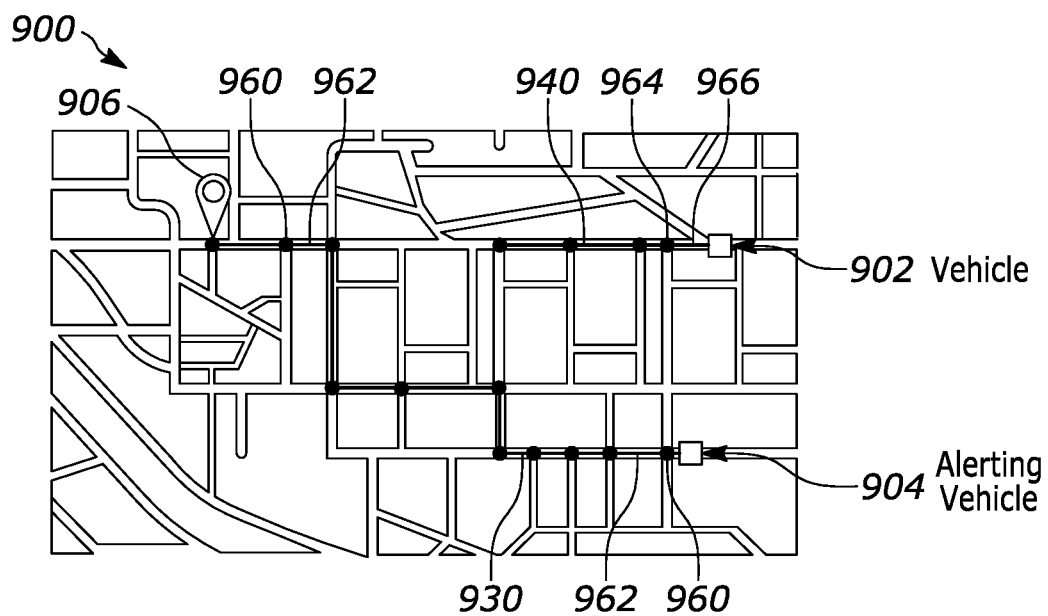
FIG. 9A depicts an example of a digital map of a road network that includes a non-alerting vehicle and an alerting vehicle.

FIG. 9A depicts an example of a digital map of a road network 900 that includes a non-alerting vehicle 902 (e.g., civilian vehicle) and an alerting vehicle 904 (e.g., a police/fire vehicle). In the example of FIG. 9A, a predicted most probable path 930 of the emergency vehicle 904 is indicated by the line emanating from the alerting vehicle to a destination 906 (e.g., the location of an emergency) and a predicted most probable path 940 of the non-alerting vehicle 902 is indicated by a line emanating from the non-alerting vehicle. In both cases, the predicted most probable path is generated at the safety cloud and expressed in terms of node IDs and link IDs as described above with reference to FIG. 5. In the example of FIG. 9A, the predicted most probable path 930 of the emergency vehicle 904 is expressed as a set of node IDs and link IDs and includes nodes 960 and links 962 (note that all nodes and links are not labeled with reference numbers to preserve clarity in the drawing), and the non-alerting vehicle 902 has a predicted most probable path 940 that is expressed as a set of node IDs and link IDs and includes nodes 964 and links 966 (note that all nodes and links are not labeled with reference numbers to preserve clarity in the drawing). In a case in which the alerting vehicle 904 is in an alerting mode (e.g., its emergency lights are on), the safety cloud will implement a matching operation as described above with reference to FIGS. 6-8. As is illustrated by the lack of overlap between the nodes and links in the road map of FIG. 9A at the time of the matching operation, there will be no matching node IDs and/or link IDs between the set of node IDs and link IDs corresponding to the non-alerting vehicle 902 and the set of node IDs and link IDs corresponding to the alerting vehicle 904. Thus, the safety cloud will not initiate an alert messaging operation with regard to the vehicle 902.

Figure 9B:
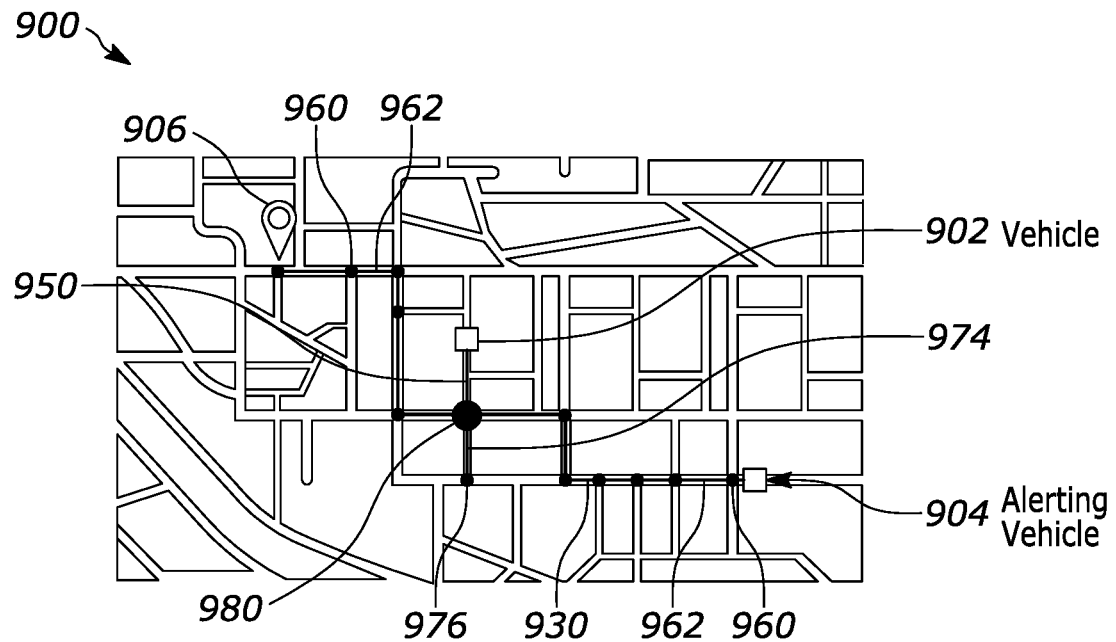
FIG. 9B depicts an example of the same digital map of the road network as FIG. 9A that includes the non-alerting vehicle and the alerting vehicle 904 in which the non-alerting vehicle is in a different location than in the example of FIG. 9A and has a different predicted most probable path.

FIG. 9B depicts an example of the same digital map of the road network 900 that includes the non-alerting vehicle 902 (e.g., civilian vehicle) and the alerting vehicle 904 (e.g., a police/fire vehicle) in which the non-alerting vehicle 902 is in a different location than in the example of FIG. 9A and has a different predicted most probable path. In the example of FIG. 9B, the predicted most probable path 930 of the alerting vehicle 904 is indicated by the line emanating from the alerting vehicle to the destination 906 (e.g., the location of an emergency) and a predicted most probable path 950 of the non-alerting vehicle 902 is indicated by the line emanating from the non-alerting vehicle. In both cases, the predicted most probable path is generated at the safety cloud and expressed in terms of node IDs and link IDs as described above with reference to FIG. 5. In the example of FIG. 9B, the predicted most probable path 930 of the alerting vehicle 904 is expressed as a set of node IDs and link IDs and includes nodes 960 and links 962 (note that all nodes and links are not labeled with reference numbers to preserve clarity in the drawing), and the non-alerting vehicle 902 has a predicted most probable path 950 that is expressed as a set of node IDs and link IDs and includes nodes 974 and links 976 (note that all nodes and links are not labeled with reference numbers to preserve clarity in the drawing). In a case in which the alerting vehicle is in an alerting mode (e.g., its emergency lights are on), the safety cloud will implement a matching operation as described above with reference to FIGS. 6-8. As is illustrated in FIG. 9B, the predicted most probable path 930 of the alerting vehicle 904 and the predicted most probable path 950 of the non-alerting vehicle 902 intersect at a roadway intersection at the time of the matching operation, so there will be a match between a node ID in the set of node IDs and link IDs corresponding to the non-alerting vehicle 902 and a node ID in the set of node IDs and link IDs corresponding to the alerting vehicle 904. Specifically, a node 980 is common to both the set of node IDs and link IDs corresponding to the non-alerting vehicle 902 and the set of node IDs and link IDs corresponding to the alerting vehicle 904. Thus, the safety cloud will initiate an alert messaging operation with regard to the vehicle 902.

Figure 10:
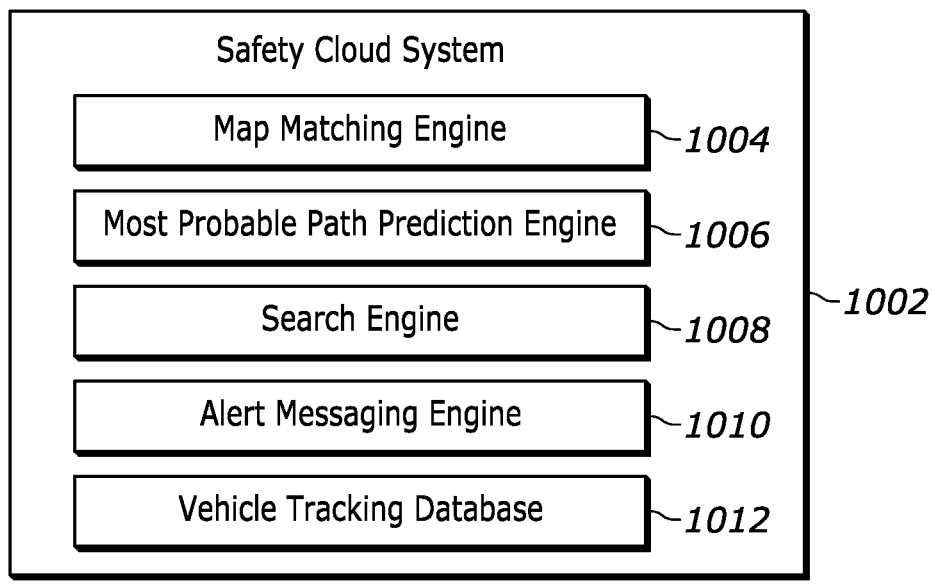
FIG. 10 is a high-level block diagram of a cloud-based safety system.

FIG. 10 is a high-level block diagram of a cloud-based safety system, referred to as safety cloud system 1002. The safety cloud system 1002 may represent an example of the safety cloud 102 described with reference to FIGS. 1 and 3A-3E. In the example of FIG. 10, the safety cloud system 1002 includes a map matching engine 1004, a most probable path prediction engine 1006, a search engine 1008, an alert messaging engine 1010, and a vehicle tracking database 1012. The safety cloud system 1002 may be implemented in software, in hardware, or in some combination of software and hardware. The safety cloud system may be implemented on one computer, on multiple computers, on one processor, or on more than one processor. When implemented on multiple computers, the computers may be connected via local bus technology, local area network (LAN) technology, and/or wide area network (WAN) technology.

The map matching engine 1004 of the safety cloud system 1002 may be configured to process vehicle telemetry data from alerting vehicles and from non-alerting vehicles to determine the location of the vehicles on a digital map. For example, the map matching engine uses latitude and longitude coordinates from the vehicle telemetry data to map the corresponding vehicle's location to a node ID and/or to a link ID on a digital map that uses a map data mode with node IDs and link IDs. Map matching to a node/link based digital map using latitude and longitude coordinates is known in the field.

The most probable path prediction engine 1006 of the safety cloud system 1002 is configured to predict a most probable path of a vehicle and then generate a set of node ID(s) and/or link ID(s) that define the most probable path. In an example, the most probable path prediction engine is configured to implement an A-star (or A*) algorithm to predict the most probable path of the vehicle. Different variations of an A-star algorithm may be used to predict the most probable path of the vehicle. Alternatively, other path prediction algorithms may be used to predict the most probable path of a vehicle. In an example, the most probable path is predicted for some specific time interval. For example, the most probable path of a vehicle may be predicted for the next X number of seconds, where X is an integer of one or more. In one example, the time interval is in the range of 10-40 seconds, or 20 seconds, or approximately 20 seconds (e.g., ±10%), although other time intervals are possible. In an example, the time interval may depend on factors such as the speed of the vehicle, the density of traffic, road conditions, weather conditions, setting (e.g., urban, residential, rural), whether or not the destination of the vehicle is known or unknown. The process of predicting the most probable path of vehicles is continuously repeated within the safety cloud. For example, the process may be repeated for a particular vehicle each time vehicle telemetry data is received at the safety cloud for that vehicle.

The vehicle tracking database 1012 of the safety cloud system 1002 is a database that is configured to store vehicle tracking information such as the information described with reference to FIGS. 6 and 7. In an example, the vehicle tracking database includes computer readable instructions that enable the storage and management of vehicle entries. The vehicle tracking database may be configured to store vehicle tracking information in various formats and using various database technologies as is known in the field of information databases.

The search engine 1008 of the safety cloud system 1002 is configured to search the vehicle tracking database 1012. In an example, the search engine is configured to search the vehicle tracking database with a search key as described with reference to FIG. 7. However, in other embodiments, the search engine may implement other search technologies.

The alert messaging engine 1010 of the safety cloud system 1002 is configured to implement alert messaging logic in response to results from the search engine. In an example, the alert messaging engine receives notifications from the search engine 1008 of a match between a search key and a vehicle entry. In an example, the notification may include a code indicating that a match was found along with the vehicle ID that corresponds to the matching vehicle entry. In an embodiment, the alert messaging engine implements an alert message ruleset to determine how to process notifications from the search engine. In one example, the alert messaging engine provides an alert message to the vehicle tracking system (FIG. 3B, 306), which is used by the vehicle tracking system to send an alert message to a vehicle that is in the safety network.

In an embodiment, the above-described cloud-based safety system is implemented by a computer or computers, which executes computer readable instructions. For example, a computer includes memory, at least one processor, and a communications interface. The at least one processor may include a multifunction processor and/or an application-specific processor. As an example, the processor could be a central processing unit (CPU) (with software), an application-specific integrated circuit (ASIC), a transceiver, a radio, or a combination thereof. The memory within the computer may include, for example, storage medium such as read only memory (ROM), flash memory, random access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

An example operation of vehicle alerting using a node/link based map data model is further described with reference back to FIGS. 3A and 3D. FIG. 3A illustrates one or more vehicles providing vehicle telemetry data (e.g., including location information) to the safety cloud 302. In particular, FIG. 3A illustrates alerting vehicle telemetry data being provided to the safety cloud 302 via the alert tracking system 304 and non-alerting vehicle telemetry data being provided to the safety cloud 302 via the vehicle tracking system 306. In an example, the safety cloud 302 includes a safety cloud system as described with reference to FIG. 10 that implements node/link based alerting as described above. For example, when an alerting vehicle goes into an emergency mode (e.g., its lights and/or siren are turned on), the alerting vehicle telemetry data includes an alert ID that is indicative of the emergency mode (e.g., that its lights and/or siren are turned on). Receipt at the safety cloud 302 of an alert ID from an alerting vehicle triggers a matching operation as described with reference to FIGS. 6-8. For example, a set of node ID(s) and/or link ID(s) corresponding to an alerting vehicle with its emergency lights on is used as the search key to search the vehicle tracking database for matches between any of the node ID(s) and/or link ID(s) in the set of node ID(s) and/or link ID(s) that form the search key and any of the node IDs and/or link IDs that correspond to the vehicle entries in the vehicle tracking database. If a match is found between a search key and any of the node IDs and/or link IDs that correspond to the vehicle entries in the vehicle tracking database, then an alert messaging operation is initiated. FIG. 3D illustrates one or more non-alerting vehicles V1 310-1, V2 310-2, and/or Vn 310-n being provided with an alert message. For example, the safety cloud 302 may generate an alert message for transmission to one or more of the non-alerting vehicles V1 310-1, V2 310-2, and/or Vn 310-n when a vehicle has a corresponding vehicle entry in a vehicle tracking database in which the vehicle entry has a node ID and/or a link ID that matches a node ID and/or a link ID of an alerting vehicle (e.g., an alerting vehicle that has its emergency lights on). In an embodiment, the safety cloud 302 sends the alert message to the vehicle tracking system 306 (represented by arrow 324) and then the vehicle tracking system 306 sends the alert message to the non-alerting vehicle V1 310-1, V2 310-2, and/or Vn 310-n via wireless connections (represented by arrows 326-1, 326-2, and 326-n). In another embodiment, the safety cloud 302 sends the alert message directly to a non-alerting vehicle V1 310-1, V2 310-2, and/or Vn 310-n via a wireless connection (represented by arrow 328). In some embodiments, the same alert message is sent to all the vehicles for which a match was found. For example, although not illustrated in FIG. 3B, the alert message may be sent to and/or received by all of the non-alerting vehicles, V1 316-1, V2 316-2, and/or Vn 316-n that are tracked in the database and that have a node ID and/or a link ID that matches a node ID and/or a link ID of an alerting vehicle (e.g., an alerting vehicle that has its emergency lights on). In some embodiments, the alert message is vehicle-specific, such that a different alert message is sent to each of the vehicles included in the safety system 300 that has a node ID and/or a link ID that matches a node ID and/or a link ID of an alerting vehicle (e.g., an alerting vehicle that has its emergency lights on). For example, a different alert message with a unique vehicle ID is transmitted for each vehicle that has a matching node ID and/or link ID.

Figure 11:
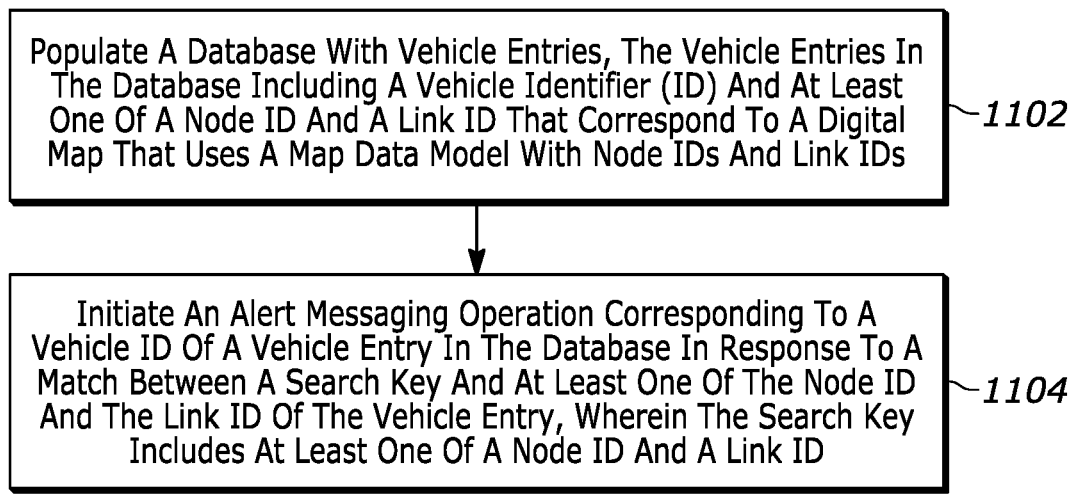
FIG. 11 is a process flow diagram of an example of a method for alerting vehicles.

FIG. 11 is a process flow diagram of an example of a method for alerting vehicles. At block 1102, a database is populated with vehicle entries, the vehicle entries in the database including a vehicle ID and at least one of a node ID and a link ID that correspond to a digital map that uses a map data model with node IDs and link IDs. At block 1104, an alert messaging operation corresponding to a vehicle ID of a vehicle entry in the database is initiated in response to a match between a search key and at least one of the node ID and the link ID of the vehicle entry, wherein the search key includes at least one of a node ID and a link ID.

In an example, the motion information corresponding to a vehicle may be generated at the safety cloud based on location information in the vehicle telemetry data. For example, the safety cloud may maintain a trajectory history for each vehicle in a vehicle tracking database and use the trajectory history to make a most probable path prediction.

In an example, telemetry data is data that is generated at a device (e.g., an on-board vehicle computer and/or a personal computing device, such as a smartphone) and wirelessly transmitted from the device to a collection device for further analysis and/or processing. In an example, the device includes at least one sensor, such as a GPS receiver, that is configured to generate the telemetry data and a wireless transceiver to transmit the telemetry data. In one example, the telemetry data is generated and transmitted at fixed intervals.

In an example, the vehicles, including the alerting vehicles and the non-alerting vehicles, are equipped with a GPS receiver to generate the vehicle telemetry data (e.g., including location and motion information) and a wireless communications transceiver (e.g., 3G, 4G, 5G transceivers) to transmit the vehicle telemetry data from the vehicle to a base station. The vehicle telemetry data can be then be sent from the base station to the safety cloud via known networking communications technologies.

In some embodiments, the technique for node/link based vehicle alerting includes a non-transitory computer readable medium including instructions to be executed in a computer system. For example, the instructions when executed in the computer system perform a technique that includes . . . . In some embodiments, the computer system that executes the instructions for vehicle data collection may be a safety cloud or a safety cloud computing system.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or a combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, random access memory (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for alerting vehicles, the method comprising:
    populating a database with vehicle entries, the vehicle entries in the database including a vehicle identifier (ID) and at least one of a node ID and a link ID that correspond to a digital map that uses a map data model with node IDs and link IDs, wherein the map data model includes links that correspond to segments of roads and nodes that correspond to intersections between segments of roads, and wherein nodes are identified by unique node IDs and links are identified by unique link IDs; and
    initiating an alert messaging operation corresponding to a vehicle ID of a vehicle entry in the database in response to a match between a search key and at least one of the node ID and the link ID of the vehicle entry, wherein the search key includes at least one of a node ID and a link ID.

2. The method of claim 1, further comprising generating a vehicle entry by:
    map matching location information corresponding to a vehicle to at least one of a node ID and a link ID on the digital map; and
    defining a most probable path of the vehicle in terms of a set of map identifiers that includes at least one of a node ID and a link ID.

3. The method of claim 2, wherein the location information includes latitude and longitude coordinates of the vehicle.

4. The method of claim 3, wherein defining the most probable path of the vehicle in terms of a set of map identifiers that includes at least one of a node ID and a link ID involves using motion information corresponding to the vehicle to predict the set of map identifiers.

5. The method of claim 4, wherein the motion information includes at least one of a speed, acceleration, trajectory, direction, and azimuth of the vehicle.

6. The method of claim 1, further comprising generating the search key, wherein generating the search key involves:
    map matching location information corresponding to an alerting vehicle to at least one of a node ID and a link ID on the digital map; and
    defining a most probable path of the alerting vehicle in terms of a set of map identifiers that includes at least one of a node ID and a link ID.

7. The method of claim 6, wherein the location information includes latitude and longitude coordinates of the vehicle.

8. The method of claim 6, wherein defining the most probable path of the alerting vehicle in terms of a set of map identifiers that includes at least one of a node ID and a link ID involves using motion information corresponding to the alerting vehicle to predict the set of map identifiers.

9. The method of claim 8, wherein the motion information includes at least one of a speed, acceleration, trajectory, direction, and azimuth of the vehicle.

10. The method of claim 1, further comprising:
    generating a vehicle entry by:
    map matching location information corresponding to a vehicle to at least one of a node ID and a link ID on the digital map; and
    defining a most probable path of the vehicle in terms of a set of map identifiers that includes at least one of a node ID and a link ID;
    generating the search key by:
    map matching location information corresponding to an alerting vehicle to at least one of a node ID and a link ID on the digital map; and
    defining a most probable path of the alerting vehicle in terms of a set of map identifiers that includes at least one of a node ID and a link ID.

11. The method of claim 10, wherein:
    the location information corresponding to the vehicle includes latitude and longitude coordinates of the vehicle; and
    the location information corresponding to the alerting vehicle includes latitude and longitude coordinates of the alerting vehicle.

12. The method of claim 11, wherein:
    defining the most probable path of the vehicle in terms of a set of map identifiers that includes at least one of a node ID and a link ID involves using motion information corresponding to the vehicle to predict the set of map identifiers; and
    defining the most probable path of the alerting vehicle in terms of a set of map identifiers that includes at least one of a node ID and a link ID involves using motion information corresponding to the alerting vehicle to predict the set of map identifiers.

13. The method of claim 12, wherein:
    the motion information corresponding to the vehicle includes at least one of a speed, acceleration, trajectory, direction, and azimuth of the vehicle; and the motion information corresponding to the alerting vehicle includes at least one of a speed, acceleration, trajectory, direction, and azimuth of the alerting vehicle.

14. The method of claim 1, further comprising:

generating a vehicle entry by:

map matching location information corresponding to a vehicle to at least one of a node ID and a link ID on the digital map; and defining a most probable path of the vehicle over a specific time interval in terms of a set of map identifiers that includes at least one of a node ID and a link ID;

generating the search key by:

map matching location information corresponding to an alerting vehicle to at least one of a node ID and a link ID on the digital map; and defining a most probable path of the alerting vehicle over a specific time interval in terms of a set of map identifiers that includes at least one of a node ID and a link ID.

15. The method of claim 14, wherein the specific time interval is in the range of 10-40 seconds.

16. A non-transitory computer readable medium comprising instructions to be executed in a computer system, wherein the instructions when executed in the computer system perform a method comprising:

populating a database with vehicle entries, the vehicle entries in the database including a vehicle identifier (ID) and at least one of a node ID and a link ID that correspond to a digital map that uses a map data model with node IDs and link IDs, wherein the map data model includes links that correspond to segments of roads and nodes that correspond to intersections between segments of roads, and wherein nodes are identified by unique node IDs and links are identified by unique link IDs; and initiating an alert messaging operation corresponding to a vehicle ID of a vehicle entry in the database in response to a match between a search key and at least one of the node ID and the link ID of the vehicle entry, wherein the search key includes at least one of a node ID and a link ID.

17. A method for alerting vehicles, the method comprising:

receiving vehicle telemetry data, the vehicle telemetry data including location information and motion information;

populating a database with data generated from the received vehicle telemetry data, wherein the database is populated with vehicle entries that include a vehicle identifier (ID) and at least one of a node ID and a link ID that correspond to a digital map that uses a map data model with node IDs and link IDs, wherein the map data model includes links that correspond to segments of roads and nodes that correspond to intersections between segments of roads, and wherein nodes are identified by unique node IDs and links are identified by unique link IDs;

receiving alerting vehicle telemetry data from an alerting vehicle, the alerting vehicle telemetry data including location information and motion information;

assigning at least one of a node ID and a link ID to the alerting vehicle in response to the vehicle telemetry data;

finding a match between a vehicle entry in the database and the alerting vehicle, wherein a match involves the vehicle entry and the alerting vehicle having at least one of a node ID and a link ID in common; and initiating an alert messaging operation corresponding to a vehicle ID of the matching vehicle entry in response to the match.

18. A method for alerting vehicles, the method comprising:

receiving first vehicle telemetry data, the first vehicle telemetry data including location information related to a first vehicle;

generating a first set of at least one of a node ID and a link ID from the first vehicle telemetry data that correspond to a digital map that uses a map data model with node IDs and link IDs, wherein the map data model includes links that correspond to segments of roads and nodes that correspond to intersections between segments of roads, and wherein nodes are identified by unique node IDs and links are identified by unique link IDs;

receiving second vehicle telemetry data, the second vehicle telemetry data including location information related to a second vehicle;

generating a second set of at least one of a node ID and a link ID from the second vehicle telemetry data; and initiating an alert messaging operation for a vehicle ID corresponding to the first vehicle in response to the first set of a node ID and a link ID and the second set of a node ID and a link ID having at least one of a node ID and a link ID in common.

\* \* \* \* \*